United States Patent
Daems et al.

(10) Patent No.: US 9,268,102 B2
(45) Date of Patent: Feb. 23, 2016

(54) CABLE TERMINATION ASSEMBLY AND METHOD FOR CONNECTORS

(71) Applicant: TYCO ELECTRONICS RAYCHEM BVBA, Kessel-Lo (BE)

(72) Inventors: Daniel Francois Daems, S-Gravenwezel (BE); Danny Willy August Verheyden, Gelrode (BE); Bart Vos, Geel (BE)

(73) Assignee: Tyco Electronics Raychem BVBA, Kessel-Lo (BE)

( * ) Notice: Subject to any disclaimer, the term of this patent is extended or adjusted under 35 U.S.C. 154(b) by 36 days.

(21) Appl. No.: 14/376,285

(22) PCT Filed: Feb. 6, 2013

(86) PCT No.: PCT/EP2013/052325
§ 371 (c)(1),
(2) Date: Aug. 1, 2014

(87) PCT Pub. No.: WO2013/117589
PCT Pub. Date: Aug. 15, 2013

(65) Prior Publication Data
US 2014/0341511 A1     Nov. 20, 2014

Related U.S. Application Data

(60) Provisional application No. 61/596,059, filed on Feb. 7, 2012, provisional application No. 61/757,968, filed on Jan. 29, 2013.

(51) Int. Cl.
*G02B 6/36* (2006.01)
*G02B 6/38* (2006.01)
*G02B 6/44* (2006.01)

(52) U.S. Cl.
CPC ............ *G02B 6/3887* (2013.01); *G02B 6/3809* (2013.01); *G02B 6/3849* (2013.01); *G02B 6/3859* (2013.01); *G02B 6/3893* (2013.01); *G02B 6/4476* (2013.01)

(58) Field of Classification Search
CPC .. G02B 6/3887; G02B 6/3809; G02B 6/3893; G02B 6/3879; G02B 6/2558; G02B 6/4478; G02B 6/4477
USPC .............................. 385/76, 53–59, 70–71, 77
See application file for complete search history.

(56) References Cited

U.S. PATENT DOCUMENTS 2,027,962 A   1/1936 Currie
3,086,242 A   4/1963 Cook et al.
(Continued)

FOREIGN PATENT DOCUMENTS

CA       2 354 718 A1   3/2002
CN       1737628        2/2006
(Continued)

OTHER PUBLICATIONS

International Search Report for International Application No. PCT/EP2013/052325 mailed Aug. 13, 2013 (4 pages).
(Continued)

*Primary Examiner* — Ellen Kim
(74) *Attorney, Agent, or Firm* — Merchant & Gould P.C.

(57) ABSTRACT

The present disclosure relates to a fiber optic connector assembly having a fiber optic connector including a main connector body and a rear insert secured within a rear cable termination end of the main connector body. The fiber optic connector assembly has a fiber optic cable that includes an optical fiber, a strength layer and an outer jacket. The optical fiber has a ferrule-less end portion accessible at a front mating end of the main connector body. A first shape recoverable sleeve secures the optical fiber to a substrate anchored to the rear insert. An axial gap exists between the forward end of the outer jacket and the rearward end of the rear insert. A second shape recoverable sleeve secures the outer jacket to the rear insert. An adhesive material at least partially fills the axial gap.

16 Claims, 19 Drawing Sheets

(56) References Cited

U.S. PATENT DOCUMENTS

| | | | |
|---|---|---|---|
| 3,395,244 | A | 7/1968 | Koehler |
| 3,597,372 | A | 8/1971 | Cook |
| 3,777,048 | A | 12/1973 | Traut |
| 4,050,783 | A | 9/1977 | Tardy |
| 4,190,316 | A | 2/1980 | Malsby et al. |
| 4,220,394 | A | 9/1980 | Tardy |
| 4,225,214 | A | 9/1980 | Hodge et al. |
| 4,291,941 | A | 9/1981 | Melzer |
| 4,309,071 | A | 1/1982 | Prunier |
| 4,320,938 | A | 3/1982 | Gunnersen et al. |
| 4,373,777 | A | 2/1983 | Borsuk et al. |
| 4,389,428 | A | 6/1983 | McDuffee et al. |
| 4,405,200 | A | 9/1983 | Hoffmann et al. |
| 4,410,469 | A | 10/1983 | Katagiri et al. |
| 4,410,561 | A | 10/1983 | Hart, Jr. |
| 4,588,256 | A | 5/1986 | Onstott et al. |
| 4,598,974 | A | 7/1986 | Munn et al. |
| 4,662,307 | A | 5/1987 | Amos et al. |
| 4,669,820 | A | 6/1987 | Ten Berge |
| 4,711,752 | A | 12/1987 | Deacon et al. |
| 4,746,194 | A | 5/1988 | Rasmussen |
| 4,787,699 | A | 11/1988 | Moulin |
| 4,798,431 | A | 1/1989 | Clark et al. |
| 4,807,958 | A | 2/1989 | Gunner et al. |
| 4,850,671 | A | 7/1989 | Finzel |
| 4,877,303 | A | 10/1989 | Caldwell et al. |
| 4,877,306 | A | 10/1989 | Kar |
| 4,902,095 | A | 2/1990 | Baker et al. |
| 4,920,366 | A | 4/1990 | Bowen et al. |
| 4,964,688 | A | 10/1990 | Caldwell et al. |
| 4,984,865 | A | 1/1991 | Lee et al. |
| 5,022,735 | A | 6/1991 | Dahlgren |
| 5,034,170 | A | 7/1991 | Briggs, Jr. et al. |
| 5,040,867 | A | 8/1991 | de Jong et al. |
| 5,042,901 | A | 8/1991 | Merriken et al. |
| 5,046,813 | A | 9/1991 | Itoh et al. |
| 5,093,048 | A | 3/1992 | Kagan |
| 5,094,552 | A | 3/1992 | Monroe et al. |
| RE34,005 | E | 7/1992 | Levinson et al. |
| 5,127,820 | A | 7/1992 | Briggs, Jr. et al. |
| 5,151,961 | A | 9/1992 | Hvezda et al. |
| 5,222,171 | A | 6/1993 | Straus |
| 5,241,613 | A | 8/1993 | Li et al. |
| 5,261,019 | A | 11/1993 | Beard et al. |
| 5,263,105 | A | 11/1993 | Johnson et al. |
| 5,309,536 | A | 5/1994 | Suganuma et al. |
| 5,317,633 | A | 5/1994 | Hiraiwa |
| 5,317,663 | A | 5/1994 | Beard et al. |
| 5,321,784 | A | 6/1994 | Cubukciyan et al. |
| 5,348,487 | A | 9/1994 | Marazzi et al. |
| 5,367,594 | A | 11/1994 | Essert et al. |
| 5,375,183 | A | 12/1994 | Edwards et al. |
| 5,390,272 | A | 2/1995 | Repta et al. |
| 5,418,874 | A | 5/1995 | Carlisle et al. |
| 5,418,876 | A | 5/1995 | Lee |
| 5,436,995 | A * | 7/1995 | Yoshizawa et al. ............ 385/86 |
| 5,446,819 | A | 8/1995 | Foster et al. |
| 5,465,313 | A | 11/1995 | Belenkiy et al. |
| 5,469,521 | A | 11/1995 | Coutts et al. |
| 5,495,545 | A | 2/1996 | Cina et al. |
| 5,582,671 | A | 12/1996 | Harman et al. |
| 5,611,017 | A | 3/1997 | Lee et al. |
| 5,631,986 | A | 5/1997 | Frey et al. |
| 5,647,043 | A | 7/1997 | Anderson et al. |
| 5,677,976 | A | 10/1997 | Takahashi |
| 5,748,819 | A | 5/1998 | Szentesi et al. |
| 5,802,230 | A | 9/1998 | Kuribayashi et al. |
| 5,806,175 | A | 9/1998 | Underwood |
| 5,815,619 | A | 9/1998 | Bloom |
| 5,832,162 | A | 11/1998 | Sarbell |
| 5,862,282 | A | 1/1999 | Matsuura et al. |
| 5,883,988 | A | 3/1999 | Yamamoto et al. |
| 5,883,995 | A | 3/1999 | Lu |
| 5,909,528 | A | 6/1999 | Tamekuni et al. |
| 5,915,056 | A | 6/1999 | Bradley et al. |
| 5,953,476 | A | 9/1999 | Abe |
| 5,960,141 | A | 9/1999 | Sasaki et al. |
| 5,963,692 | A | 10/1999 | Marazzi et al. |
| 5,963,698 | A | 10/1999 | Brugger et al. |
| 6,054,007 | A | 4/2000 | Boyd et al. |
| 6,068,410 | A | 5/2000 | Giebel et al. |
| 6,079,880 | A | 6/2000 | Blom |
| 6,120,193 | A | 9/2000 | Luther et al. |
| 6,142,676 | A | 11/2000 | Lu |
| 6,152,609 | A | 11/2000 | Dzyck et al. |
| 6,173,097 | B1 | 1/2001 | Throckmorton et al. |
| 6,179,482 | B1 | 1/2001 | Takizawa et al. |
| 6,179,658 | B1 | 1/2001 | Gunay et al. |
| 6,186,672 | B1 | 2/2001 | Takizawa et al. |
| 6,247,850 | B1 | 6/2001 | Edwards et al. |
| 6,325,670 | B2 | 12/2001 | Murayama |
| 6,340,249 | B1 | 1/2002 | Hayes et al. |
| 6,341,898 | B1 | 1/2002 | Matsushita |
| 6,419,402 | B1 | 7/2002 | Zimmel |
| 6,419,810 | B1 | 7/2002 | Tanaka et al. |
| 6,432,511 | B1 | 8/2002 | Davis et al. |
| 6,439,780 | B1 | 8/2002 | Mudd et al. |
| 6,456,768 | B1 | 9/2002 | Boncek et al. |
| 6,498,888 | B1 | 12/2002 | Chenard et al. |
| 6,503,422 | B2 | 1/2003 | Chudoba et al. |
| 6,513,989 | B1 | 2/2003 | Bleck et al. |
| 6,520,689 | B2 | 2/2003 | DeMartino et al. |
| 6,532,327 | B1 | 3/2003 | Gatica et al. |
| 6,543,941 | B1 | 4/2003 | Lampert |
| 6,550,279 | B1 | 4/2003 | Anderson et al. |
| 6,550,977 | B2 | 4/2003 | Hizuka |
| 6,565,261 | B1 * | 5/2003 | Uchiyama et al. ............... 385/60 |
| 6,579,014 | B2 | 6/2003 | Melton et al. |
| 6,588,235 | B2 | 7/2003 | Trentelman et al. |
| 6,648,520 | B2 | 11/2003 | McDonald et al. |
| 6,695,489 | B2 | 2/2004 | Nault |
| 6,715,933 | B1 | 4/2004 | Zimmer et al. |
| 6,719,927 | B2 | 4/2004 | Sakurai et al. |
| 6,726,370 | B2 | 4/2004 | Shimotsu |
| 6,728,452 | B2 | 4/2004 | Nishimura |
| 6,738,552 | B2 | 5/2004 | Hirsch |
| 6,742,936 | B1 | 6/2004 | Knecht et al. |
| 6,782,182 | B2 | 8/2004 | Dautartas et al. |
| 6,793,404 | B2 | 9/2004 | Kraus et al. |
| 6,796,721 | B2 | 9/2004 | Matsumoto et al. |
| 6,811,321 | B1 | 11/2004 | Schmalzigaug et al. |
| 6,811,323 | B2 | 11/2004 | Murray et al. |
| 6,819,858 | B2 | 11/2004 | Steinberg et al. |
| 6,827,508 | B2 | 12/2004 | Stowe |
| 6,840,687 | B2 | 1/2005 | Riis et al. |
| 6,848,837 | B2 | 2/2005 | Gilligan |
| 6,856,748 | B1 | 2/2005 | Elkins, II et al. |
| 6,893,591 | B2 | 5/2005 | Davis et al. |
| 6,899,467 | B2 | 5/2005 | McDonald et al. |
| 6,908,236 | B2 | 6/2005 | Oishi et al. |
| 6,918,703 | B2 | 7/2005 | Chen et al. |
| 6,918,704 | B2 | 7/2005 | Marrs et al. |
| 6,945,706 | B2 | 9/2005 | Gimbel et al. |
| 6,962,446 | B2 | 11/2005 | Greub et al. |
| 6,964,578 | B2 | 11/2005 | Clark et al. |
| 6,979,133 | B2 | 12/2005 | Montena |
| 7,016,592 | B2 | 3/2006 | Elkins, II et al. |
| 7,044,650 | B1 | 5/2006 | Tran et al. |
| 7,088,893 | B2 | 8/2006 | Cooke et al. |
| 7,090,406 | B2 | 8/2006 | Melton et al. |
| 7,104,702 | B2 | 9/2006 | Barnes et al. |
| 7,137,742 | B2 | 11/2006 | Theuerkorn et al. |
| 7,140,786 | B2 | 11/2006 | Takayanagi et al. |
| 7,147,384 | B2 | 12/2006 | Hardcastle et al. |
| 7,147,385 | B2 | 12/2006 | Zimmel et al. |
| 7,184,634 | B2 | 2/2007 | Hurley et al. |
| 7,216,512 | B2 | 5/2007 | Danley et al. |
| 7,220,061 | B2 | 5/2007 | De Marchi |
| 7,234,881 | B2 | 6/2007 | Koike et al. |
| 7,264,402 | B2 | 9/2007 | Theuerkorn et al. |
| 7,264,410 | B1 | 9/2007 | Doss et al. |
| 7,290,941 | B2 | 11/2007 | Kiani et al. |
| 7,298,941 | B2 | 11/2007 | Palen et al. |
| 7,329,049 | B2 | 2/2008 | Meek et al. |

(56) References Cited

U.S. PATENT DOCUMENTS

| | | | |
|---|---|---|---|
| 7,349,605 B2 | 3/2008 | Noonan et al. |
| 7,352,938 B2 | 4/2008 | Bianchi |
| 7,371,082 B2 | 5/2008 | Zimmel et al. |
| 7,407,331 B2 | 8/2008 | Momotsu et al. |
| 7,412,130 B2 | 8/2008 | Harness et al. |
| 7,438,485 B2 | 10/2008 | Tabata et al. |
| 7,455,460 B2 | 11/2008 | Pimpinella et al. |
| 7,467,896 B2 | 12/2008 | Melton et al. |
| 7,490,994 B2 | 2/2009 | Scadden et al. |
| 7,507,031 B2 | 3/2009 | Kawasaki |
| 7,534,050 B2 | 5/2009 | Kachmar |
| 7,534,051 B2 | 5/2009 | Nishioka et al. |
| 7,537,393 B2 | 5/2009 | Anderson et al. |
| 7,553,089 B2 | 6/2009 | Gurreri et al. |
| 7,572,065 B2 | 8/2009 | Lu et al. |
| 7,578,623 B2 | 8/2009 | Wang et al. |
| 7,594,764 B2 | 9/2009 | Palmer et al. |
| 7,596,293 B2 | 9/2009 | Isenhour et al. |
| 7,628,549 B2 | 12/2009 | Takahashi et al. |
| 7,677,812 B2 | 3/2010 | Castagna et al. |
| 7,708,476 B2 | 5/2010 | Liu |
| 7,744,286 B2 | 6/2010 | Lu et al. |
| 7,744,288 B2 | 6/2010 | Lu et al. |
| 7,756,370 B2 | 7/2010 | Hayasaka |
| 7,758,256 B2 | 7/2010 | Hopkins et al. |
| 7,758,257 B2 | 7/2010 | Anderson et al. |
| 7,762,726 B2 | 7/2010 | Lu et al. |
| 7,764,402 B2 | 7/2010 | Kakutani et al. |
| 7,766,556 B2 | 8/2010 | Kachmar |
| 7,785,016 B2 | 8/2010 | Luther et al. |
| 7,802,926 B2 | 9/2010 | Leeman et al. |
| 7,860,363 B2 | 12/2010 | Kawasaki |
| 7,874,738 B2 | 1/2011 | Lu |
| 7,881,576 B2 | 2/2011 | Melton et al. |
| 7,918,609 B2 | 4/2011 | Melton et al. |
| 7,942,590 B2 | 5/2011 | Lu et al. |
| 7,942,591 B2 | 5/2011 | Hopkins et al. |
| 7,959,361 B2 | 6/2011 | Lu et al. |
| 8,038,356 B2 | 10/2011 | Marcouiller et al. |
| 8,041,166 B2 | 10/2011 | Kachmar |
| 8,043,013 B2 | 10/2011 | Lichoulas et al. |
| 8,047,726 B2 | 11/2011 | Tamekuni et al. |
| 8,094,988 B2 | 1/2012 | Billman et al. |
| 8,109,679 B2 | 2/2012 | Danley et al. |
| 8,202,008 B2 | 6/2012 | Lu et al. |
| 8,224,141 B2 | 7/2012 | Kachmar et al. |
| 8,256,969 B2 | 9/2012 | Arai et al. |
| 8,262,294 B2 | 9/2012 | Marcouiller et al. |
| 8,262,380 B2 | 9/2012 | Yu et al. |
| 8,342,755 B2 | 1/2013 | Nhep |
| 8,408,813 B2 | 4/2013 | Barnes et al. |
| 8,414,196 B2 * | 4/2013 | Lu et al. ............... 385/60 |
| 8,459,877 B2 | 6/2013 | Barnes et al. |
| 8,494,331 B2 | 7/2013 | Takeuchi et al. |
| 8,548,293 B2 | 10/2013 | Kachmar |
| 8,596,888 B2 | 12/2013 | Huang et al. |
| 8,636,425 B2 | 1/2014 | Nhep |
| 8,646,989 B2 * | 2/2014 | Zimmel et al. ............ 385/81 |
| 8,662,760 B2 * | 3/2014 | Cline et al. ............. 385/76 |
| 8,676,018 B2 | 3/2014 | Barnes et al. |
| 8,690,454 B2 | 4/2014 | Tamekuni et al. |
| 8,702,323 B2 | 4/2014 | Nhep |
| 2001/0033730 A1 | 10/2001 | Fentress |
| 2002/0067894 A1 | 6/2002 | Scanzillo |
| 2002/0146214 A1 | 10/2002 | Tanaka et al. |
| 2003/0063868 A1 | 4/2003 | Fentress |
| 2004/0057672 A1 | 3/2004 | Doss et al. |
| 2004/0062480 A1 | 4/2004 | Cronk et al. |
| 2005/0042387 A1 | 2/2005 | Dower |
| 2005/0175308 A1 | 8/2005 | Elkins, II et al. |
| 2005/0238292 A1 | 10/2005 | Barnes et al. |
| 2005/0281509 A1 | 12/2005 | Cox et al. |
| 2006/0002662 A1 | 1/2006 | Manning et al. |
| 2006/0103039 A1 | 5/2006 | Shields et al. |
| 2008/0193089 A1 | 8/2008 | Miyamoto et al. |
| 2009/0162016 A1 | 6/2009 | Lu et al. |
| 2010/0124394 A1 | 5/2010 | Meek et al. |
| 2010/0254659 A1 | 10/2010 | Anderson et al. |
| 2010/0303425 A1 | 12/2010 | Liu |
| 2011/0103753 A1 | 5/2011 | Wouters |
| 2011/0280525 A1 | 11/2011 | Marcouiller et al. |
| 2012/0177328 A1 | 7/2012 | Marcouiller et al. |
| 2012/0219258 A1 | 8/2012 | Grandidge et al. |
| 2012/0263421 A1 * | 10/2012 | Andrzejewski et al. ....... 385/77 |
| 2012/0288238 A1 | 11/2012 | Park et al. |
| 2012/0328247 A1 | 12/2012 | Kachmar |
| 2013/0136857 A1 | 5/2013 | Blanchetiere et al. |
| 2014/0064665 A1 | 3/2014 | Ott et al. |
| 2014/0086534 A1 | 3/2014 | Lu et al. |
| 2014/0133804 A1 | 5/2014 | Lu et al. |

FOREIGN PATENT DOCUMENTS

| | | |
|---|---|---|
| DE | 30 02 473 | 9/1981 |
| DE | 195 17 750 A1 | 11/1996 |
| EP | 0 125 398 A1 | 11/1984 |
| EP | 0 479 415 A2 | 4/1992 |
| EP | 0 689 070 A1 | 12/1995 |
| EP | 0 810 455 A1 | 12/1997 |
| EP | 0 916 974 A2 | 5/1999 |
| EP | 1 122 564 A2 | 8/2001 |
| EP | 2 317 356 | 5/2011 |
| GB | 2 062 283 A | 5/1981 |
| GB | 2 148 537 A | 5/1985 |
| JP | 59-177513 | 10/1984 |
| JP | 61-9612 | 1/1986 |
| JP | 61-284710 | 12/1986 |
| JP | 4-40402 | 2/1992 |
| JP | 7-234344 | 9/1995 |
| JP | 8-122567 | 5/1996 |
| JP | 8-234042 | 9/1996 |
| JP | 8-262271 | 10/1996 |
| JP | 2002-82257 | 3/2002 |
| JP | 2008-116840 | 5/2008 |
| JP | 2009-192908 | 8/2009 |
| JP | 2011-2705 | 1/2011 |
| JP | 2011-95410 | 5/2011 |
| TW | 571134 | 1/2004 |
| TW | 592934 | 6/2004 |
| WO | WO 97/23797 | 7/1997 |
| WO | WO 01/27673 | 4/2001 |
| WO | WO 01/42836 | 6/2001 |
| WO | WO 2004/028993 | 4/2004 |
| WO | WO 2009/011799 | 1/2009 |
| WO | WO 2009/076364 | 6/2009 |
| WO | WO 2010/039837 | 4/2010 |
| WO | WO 2010/090211 | 8/2010 |
| WO | WO 2010/118031 | 10/2010 |
| WO | WO 2011/087941 | 7/2011 |
| WO | WO 2011/087942 | 7/2011 |
| WO | WO 2011/087944 | 7/2011 |
| WO | WO 2012/005407 | 1/2012 |
| WO | WO 2012/112344 | 8/2012 |

OTHER PUBLICATIONS

"Considerations for Optical Fiber Termination," AEN 89, Revision 3, Corning Cable Systems LLC, pp. 1-7 (Copyright 2008).

FuseConnect™ Fusion Spliced Field-terminated SC Connector, AFL Telecommunications, 6 pages (Copyright 2007).

Abe, K. et al., "Modal interference in a short fiber section: fiber length, splice loss, cutoff, and wavelength dependences," *Optical Fiber Communication Conference*, p. 139, No. ThA3 (Feb. 1991).

De Jong, M., "Cleave and crimp fiber optic connector for field installation," *Optical Fiber Communication Conference, 1990 Technical Digest Series*, vol. 1, Conference Edition, 3 pages (Jan. 1990).

Duff, D.G. et al., "Measurements of modal noise in single-mode lightwave systems," Conference on Optical Fiber Communication, Paper No. TU01, 5 pages (Feb. 1985).

FuseConnect™ ST Installation & Assembly Instructions, 14 pages (Mar. 2, 2011).

Goodwin, J.C. et al., "Modal Noise in Short Fiber Sections," Journal of Lightwave Technology, vol. 9, No. 8, pp. 954-958 (Aug. 1991).

(56) References Cited

OTHER PUBLICATIONS

Harris, D. et al., "Azimuthal Dependence of Modal Interference in Closely Spaced Single-Mode Fiber Joints," IEEE Photonics Technology Letters, vol. 6, No. 10, pp. 1235-1237 (Oct. 1994).

Harris, D.O. et al., "Characterizing Modal Interference in Field Installable Single-Mode Fiber Connectors Incorporating Short Fiber Stubs," Technical Digest—Symposium on Optical Fiber Measurements, NIST Special Publication 864, pp. 35-38 (Sep. 1994).

Heckmann, S., "Modal noise in single-mode fibres operated slightly above cutoff," Electronics Letters, vol. 17, No. 14, pp. 499-500 (Jul. 1981).

Li, M-J. et al., "Optical Fiber Design for Field Mountable Connectors," Journal of Lightwave Technology, vol. 18, No. 3, pp. 314-319 (Mar. 2000).

Lynx2 CustomFit® MPO Splice-On Connector, http://www.sumitoelectric.com/products/nisionsplicers/lynx_mpo/, 2 pages (Copyright 2011).

Ohzawa, K. et al., "Development of new optical fiber fusion splicer for factory use," International Wire & Cable Symposium Proceedings, pp. 644-649 (1999).

Olson, G. et al., "Modal Noise in Single-Mode Fiber-Optic Systems with Closely Spaced Splices," Fiber and Integrated Optics, vol. 9, pp. 237-244 (1990).

Throckmorton, R. et al., "Modal Interference in Field Installable Single-Mode Fiber-Optic Connectors," Proc. 10th National Fiber Optic Engineers Conference, vol. 3, pp. 399-406 (1994).

Yablon, Andrew D., "Optical Fusion Splicing" Section 6.6.1; 5 pp.

\* cited by examiner

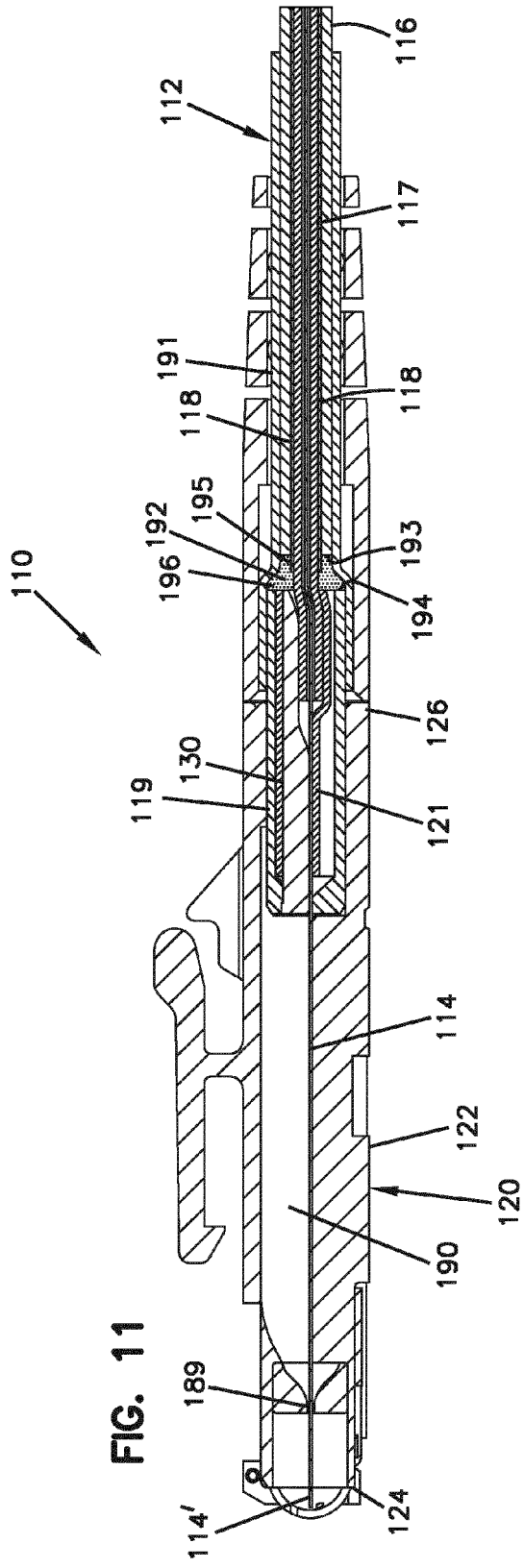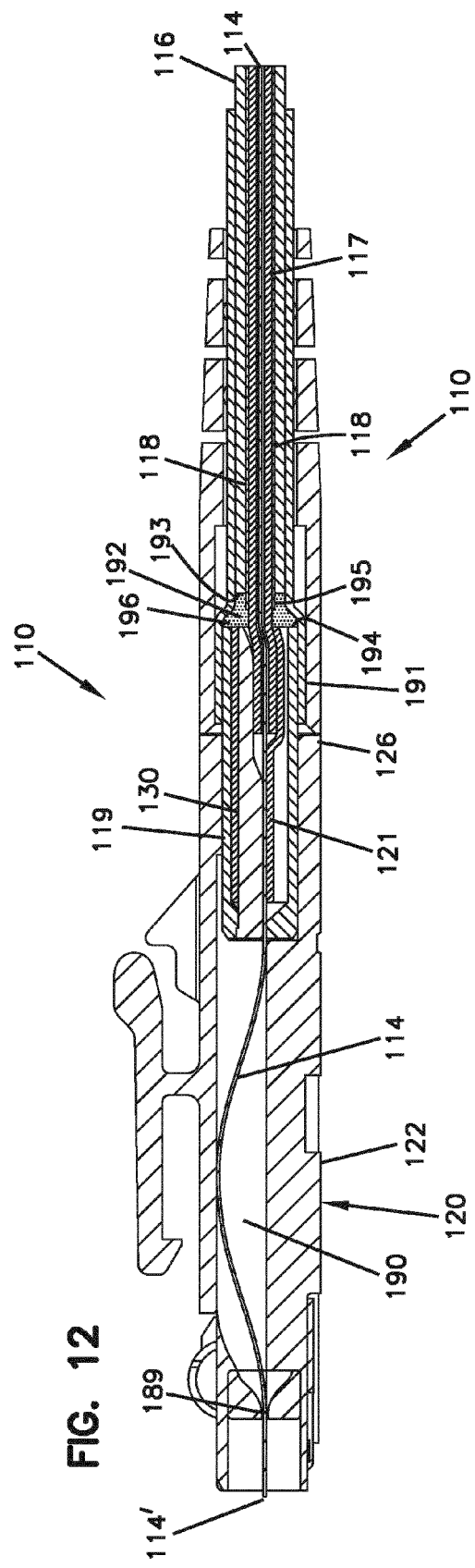

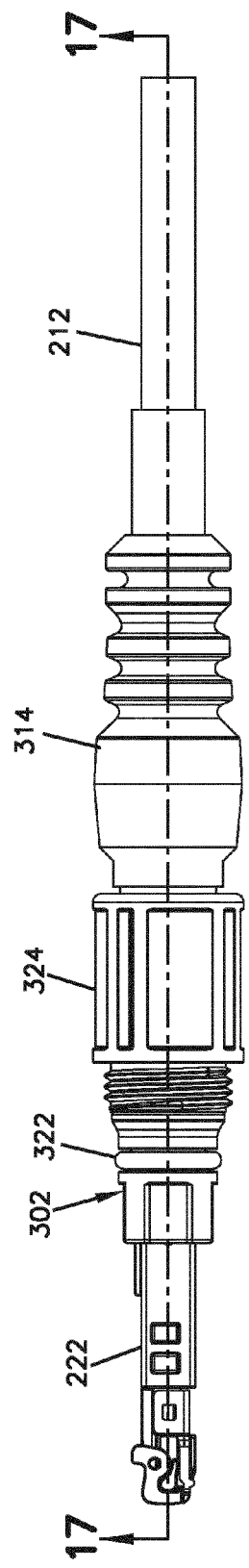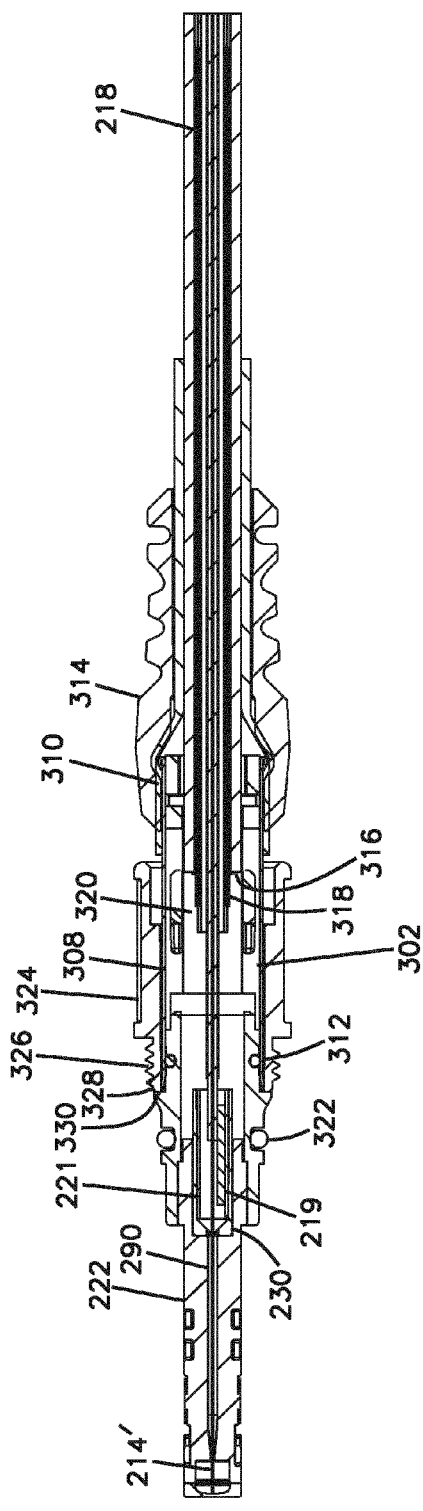
FIG. 16
FIG. 17

CABLE TERMINATION ASSEMBLY AND METHOD FOR CONNECTORS

This application is a National Stage Application of PCT/EP2013/052325, filed 6 Feb. 2013, which claims benefit of U.S. Provisional Ser. No. 61/596,059, filed 7 Feb. 2012 and U.S. Provisional Ser. No. 61/757,968, filed 29 Jan. 2013 and which applications are incorporated herein by reference. To the extent appropriate, a claim of priority is made to each of the above disclosed applications.

TECHNICAL FIELD

The present disclosure relates generally to fiber optic equipment. More particularly, the present disclosure relates to a termination assembly and method for fixing a fiber optic cable to a fiber optic connector.

BACKGROUND

Fiber optic communication systems are becoming prevalent in part because service providers want to deliver high band width communication capabilities to customers. Fiber optic communication systems may employ a network of connectorized fiber optic cables to transmit large volumes of data and voice signals over relatively long distances. Being part of a large fiber optic network, connectorized cables routed to and from telecommunications equipment may be exposed to pulling forces.

Current methods used for terminating and fixing fiber optic cables to connectors have certain shortcomings. Strength members (e.g., in the form of aramid yarns) of fiber optic cables are normally crimped down first on the body of a connector by a metallic crimp sleeve. The cable jacket is then normally fixed to the connector body by a second crimp sleeve. The crimping tools used by technicians for crimping the inner crimp sleeve and the outer crimp sleeve must be regularly calibrated and checked often for wear. When proper maintenance is not performed, the strength members can slide out of the crimp during loads on the connector.

It is desirable to provide an effective and low maintenance cable fixation assembly and method to limit damage to optical fibers within the connectorized cables.

SUMMARY

Certain aspects of the present disclosure relate to effective and low maintenance arrangements for providing proper fixation or termination of fiber optic cables to fiber optic connectors.

According to one inventive aspect, the disclosure relates to a fiber optic connector assembly that comprises a fiber optic cable including an optical fiber, an outer jacket surrounding the optical fiber, and a strength member layer between the optical fiber and the outer jacket, wherein a portion of the outer jacket has been stripped to expose a length of the optical fiber and a length of the strength member layer. The fiber optic connector assembly further includes a connector body that receives at least a portion of the exposed length of the optical fiber, a strength member clamp coupled to the connector body, and a heat-recoverable tube placed over the strength member clamp. A first portion of the exposed length of the strength member layer is captured between the connector body and the strength member clamp and a second portion of the exposed length of the strength member layer is captured between the heat-recoverable tube and the strength member clamp.

One inventive aspect relates to providing a fiber optic connector assembly with a strength clamp in which a strength member layer of the cable is routed around an edge and positioned in a reverse direction, then captured under a heat-recoverable tube.

According to another inventive aspect, the disclosure relates to a fiber optic connector assembly comprising a fiber optic cable including an optical fiber, an outer jacket surrounding the optical fiber, and a strength member layer between the optical fiber and the outer jacket, wherein a portion of the outer jacket has been stripped to expose a length of the optical fiber and a length of the strength member layer. The assembly further includes a connector body defining a front end and a rear end and configured to receive the exposed length of the optical fiber through the rear end thereof, the connector body including a notch adjacent the rear end thereof. The assembly further includes a strength member clamp defining a front end, a rear end, and a throughhole extending therebetween, the throughhole configured to receive the outer jacket when the strength member clamp is slid rearwardly over thereof, the strength member clamp defining a projection extending transversely toward a longitudinal axis of the strength member clamp, the projection configured to be inserted within the notch for coupling the strength member clamp to the connector body, wherein a first portion of the exposed length of the strength member layer is captured between the projection and the notch and a second portion of the exposed length of the strength member layer is folded rearwardly over an exterior of the strength member clamp after the strength member clamp has been slid over thereof. A heat-recoverable tube is placed over the strength member clamp and fixes the strength member clamp relative to the connector body, the heat-recoverable tube covering the first portion of the exposed length of the strength member layer that is captured between the projection and the notch and at least partially covering the second portion of the exposed length of the strength member layer that is folded rearwardly over the exterior of the strength member clamp.

According to yet another inventive aspect, the disclosure relates to a method of fixing a fiber optic cable to a connector body. The method comprises providing a fiber optic cable including an optical fiber, an outer jacket surrounding the optical fiber, and a strength member layer between the optical fiber and the outer jacket, stripping a portion of the outer jacket to expose a length of the optical fiber and a length of the strength member layer, sliding a strength member clamp rearwardly over the outer jacket, and sliding a heat-recoverable tube rearwardly over the outer jacket. The method further comprises folding a portion the exposed length of the strength member layer rearwardly over an exterior of the strength member clamp after sliding the strength member clamp over the exposed length of the strength member layer, inserting a portion of the exposed length of the optical fiber into a connector body, and coupling the strength member clamp to the connector body so as to capture another portion of the exposed length of the strength member between the connector body and the strength member clamp. After a portion of the exposed length of the strength member has been folded rearwardly over the exterior of the strength member clamp, the heat-recoverable tube is used to cover the other portion of the exposed length of the strength member layer that is captured between the strength member clamp and the connector body and to at least partially cover the folded portion of the exposed length of the strength member layer that has been folded rearwardly over the exterior of the strength member clamp.

According to yet another inventive aspect, the disclosure relates to a kit for fixing a fiber optic cable to a connector body. The kit comprises a length of fiber optic cable, the length of fiber optic cable including an optical fiber, an outer jacket surrounding the optical fiber, and a strength member layer between the optical fiber and the outer jacket, a connector body defining a front end and a rear end, the connector body including a notch adjacent the rear end thereof, a strength member clamp defining a front end, a rear end, and a throughhole extending therebetween, the strength member clamp defining a projection extending transversely toward a longitudinal axis of the strength member clamp, the projection configured to be inserted within the notch for coupling the strength member clamp to the connector body and for capturing at least a portion of the strength member layer therebetween, a length of heat-recoverable tubing for placement over the strength member clamp for fixing the strength member clamp to the connector body, and a strain-relief boot for slidable placement over the length of heat-recoverable tubing.

The present disclosure relates to a fiber optic connector assembly having a fiber optic connector including a main connector body having a front mating end and a rear cable termination end. The fiber optic connector also includes a rear insert secured within the rear cable termination end of the main connector body. The fiber optic connector assembly has a fiber optic cable that includes an optical fiber, a strength layer and an outer jacket. The optical fiber extends from the fiber optic cable forwardly through the main connector body and has a ferrule-less end portion accessible at the front mating end of the main connector body. The optical fiber is secured to a fiber securement substrate by a first shape recoverable sleeve. The fiber securement substrate is anchored within the rear insert. The outer jacket of the fiber optic cable has a forward end and the rear insert has a rearward end. The forward end of the outer jacket is positioned such that an axial gap exists between the forward end of the outer jacket and the rearward end of the rear insert. The fiber optic connector assembly also has a second shape recoverable sleeve that secures the outer jacket to the rear insert. The second shape recoverable sleeve overlaps and is bonded to outer surfaces of the outer jacket and the rear insert. The second shape coverable sleeve traverses the axial gap and an adhesive material at least partially fills the axial gap.

A variety of additional inventive aspects will be set forth in the description that follows. The inventive aspects can relate to individual features and to combinations of features. It is to be understood that both the foregoing general description and the following detailed description are exemplary and explanatory only and are not restrictive of the broad inventive concepts upon which the embodiments disclosure herein are based.

BRIEF DESCRIPTION OF THE DRAWINGS

FIG. 11 is a cross-sectional view of another fiber optic connector assembly in accordance with the principles of the present disclosure;

FIG. 12 is a cross-sectional view of the fiber optic connector assembly of FIG. 11 with the optical fiber curved within a fiber buckling region of the fiber optic connector assembly;

FIG. 16 is a side view of the fiber optic connector assembly of FIG. 13;

FIG. 17 is a cross-sectional view taken along section 17-17 of FIG. 16;

DETAILED DESCRIPTION

Figure 1:
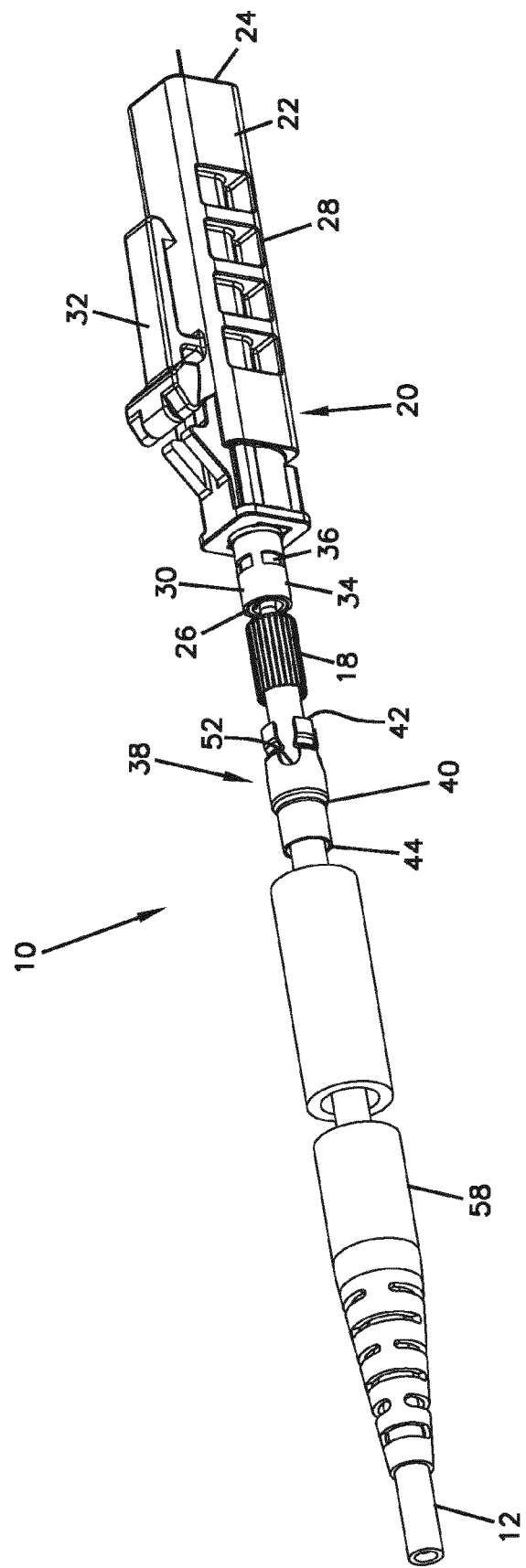
FIG. 1 is a fiber optic connector assembly having features that are examples of inventive aspects in accordance with the present disclosure, the fiber optic connector assembly illustrated in a partially assembled configuration with the exposed strength member layer of the fiber optic cable folded rearwardly over the outer jacket to allow the exposed optical fiber to be inserted into the connector of the assembly.

The present disclosure relates to arrangements and methods for providing effective and low maintenance fixation or termination of fiber optic cables to fiber optic connectors.

Referring to FIGS. 1-10, a fiber optic connector assembly 10 is illustrated. The fiber optic assembly 10 includes a fiber optic cable 12 including an optical fiber 14, an outer jacket 16 surrounding the optical fiber 14 and a strength member layer 18 between the optical fiber 14 and the outer jacket 16. The outer jacket 16, according to one example embodiment, may define an outer diameter of about 2.0 mm. The strength member layer 18, according to one example embodiment, may be formed from flexible aramid yarns (e.g., Kevlar) extending longitudinally within the cable 12 between the outer jacket 16 and the optical fiber 14.

The fiber optic connector assembly 10 further includes a fiber optic connector 20 defining a connector body 22. As will be discussed in further detail below, the fiber optic cable 12 is fixed or terminated to the connector body 22 in accordance with the inventive methods of the present disclosure so as to form the fiber optic connector assembly 10.

The connector body 22 defines a front mating end 24 and a rear cable termination end 26. The connector body 22 includes a front housing 28 that defines the front mating end 24 and a rear insert 30 that is coupled to the front housing 28, wherein the rear insert 30 defines the rear cable termination end 26 of the connector body 22.

As shown in FIGS. 1-5, the front housing 28 defines structure 32 for coupling the connector body 22 to a fiber optic adapter for mating with a similar fiber optic connector body for optical connectivity. The front housing 28 may be manufactured from polymeric materials. The rear insert 30 is configured to be inserted into the front housing 28 and coupled thereto with a mechanical type attachment (including a snap-fit, a friction-fit, ultrasonic welding, etc.). The rear insert 30 may be manufactured from a metallic material.

As shown in FIG. 1, according to the depicted example, a portion 34 of the rear insert 30 that protrudes from the front housing 28 once inserted therein defines a generally cylindrical shape. The cylindrical portion 34 defines series of notches 36 around the perimeter thereof, the purpose of which will be discussed in further detail below.

Still referring to FIGS. 1-10, the fiber optic connector assembly 10 also includes a strength member clamp 38. As will be discussed in further detail below, the strength member clamp 38 is configured to capture the strength member layer 18 of the fiber optic cable 12 against the rear insert 30 of the connector body 22 in terminating the cable 12 to the connector 20.

According to the depicted embodiment, the strength member clamp 38 defines a clamp body 40 having a front end 42, a rear end 44, and a throughhole 46 extending therebetween along a longitudinal axis 64. The clamp body 40 defines a complete circular ring portion 48 adjacent the rear end 44. Adjacent the front end 42, the clamp body 40 defines a plurality of fingers 50 extending forwardly, the plurality of fingers 50 defining slits 52 therebetween. Each finger 50 defines a projection 54 that extends transversely toward the longitudinal axis 64. Each finger 50 is configured to elastically flex in a radial direction when coupling the strength member clamp 38 to the rear insert 30 such that the projections 54 snap-fit into the notches 36 of the rear insert 30. The strength member clamp 38 may also be manufactured from a metallic material.

The fiber optic connector assembly 10 also includes a length of heat-recoverable tubing 56 configured to be placed over the strength member clamp 38 and fix the strength member clamp 38 relative to the rear insert 30, as will be described in further detail below.

Figure 5:
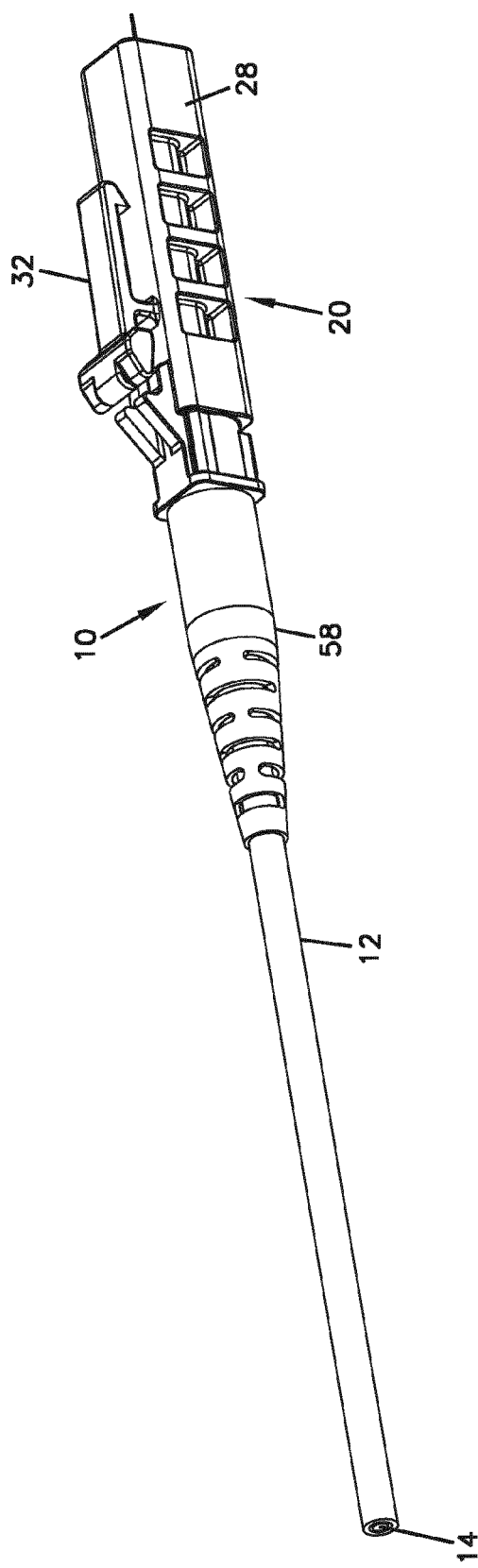
FIG. 5 illustrates the fiber optic connector assembly of FIGS. 1-5 in a fully assembled configuration with the strain relief boot slid over the heat-recoverable tube.
Figure 6:
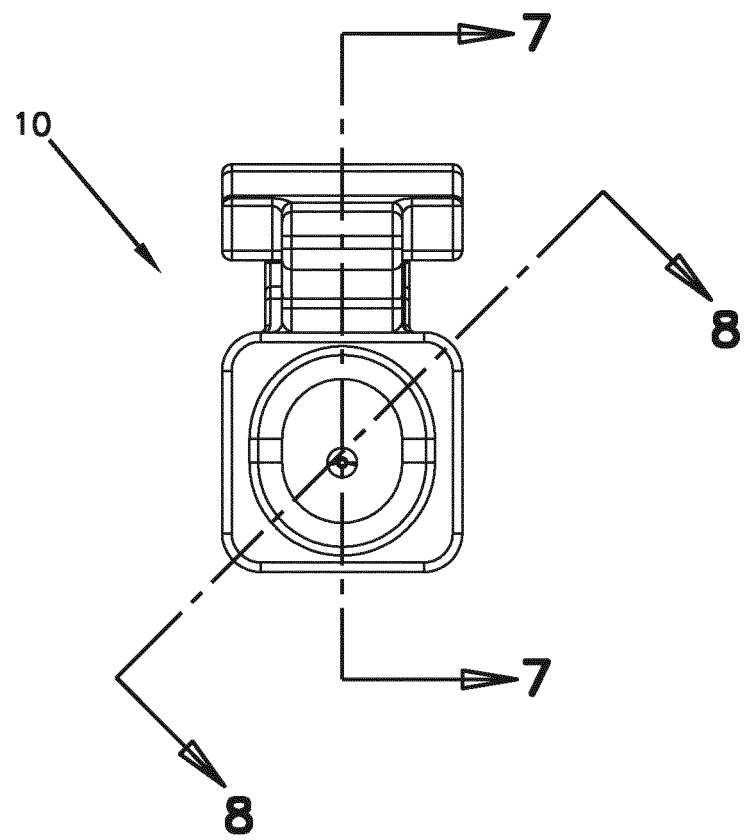
FIG. 6 is a front view of the fiber optic connector assembly of FIG. 5.

As shown in FIG. 5, the fiber connector assembly 10 may also include a strain relief boot 58 that is configured to be slid over the heat-recoverable tubing 56 once the fiber optic cable 12 is terminated to the connector body 22.

According to an example method of terminating the fiber optic cable 12 to the fiber optic connector 20 as shown in FIGS. 1-5, the strain-relief boot 58, the heat-recoverable tubing 56, and the strength member clamp 38 may first be slid over the outer jacket 16 of the cable 12 from an end of the cable to be terminated. Thereafter, a portion of the outer jacket 16 may be stripped to expose a length of the optical fiber 14 and a length of the strength member layer 18. As shown in FIG. 1, the exposed length of the strength member layer 18 may be folded rearwardly over the outer jacket 16 to allow the exposed length of the optical fiber 14 to be inserted into the connector 20 of the assembly 10.

Figure 2:
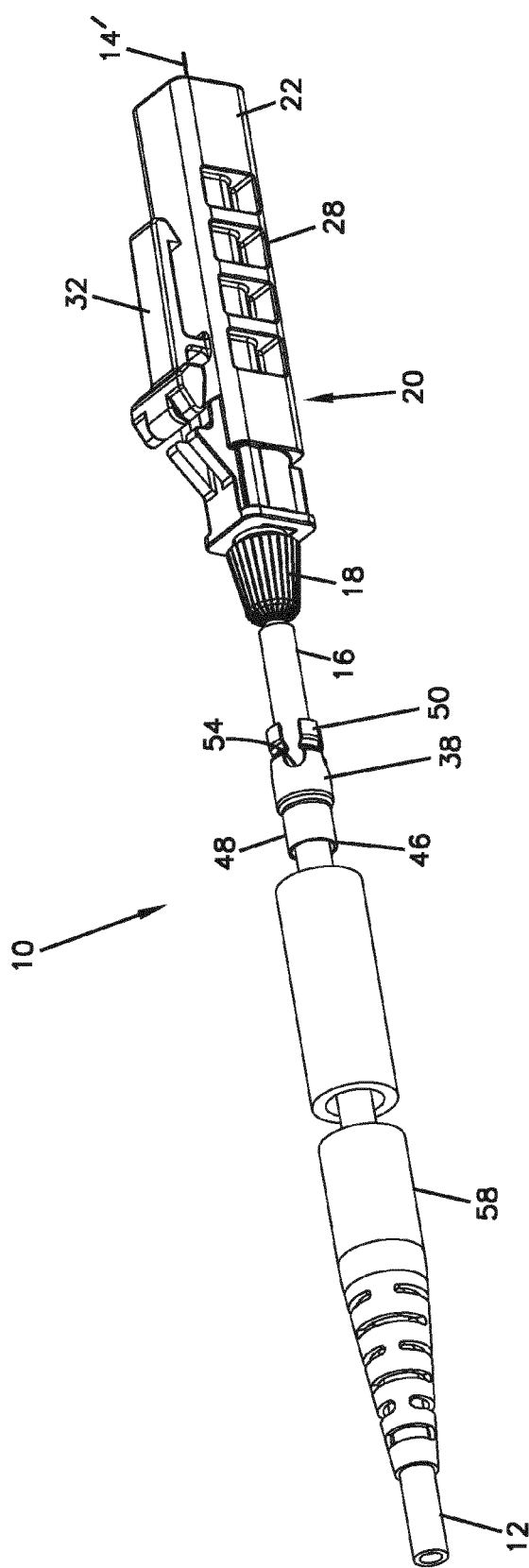
FIG. 2 illustrates the fiber optic connector assembly of FIG. 1 in a partially assembled configuration with the strength member layer of the fiber optic cable positioned over the rear insert of the connector of the assembly after the optical fiber has been inserted into the connector of the assembly.

As shown in FIG. 2, once the front end of the exposed length of the optical fiber 14 is inserted into the rear insert 30, the strength member layer 18 may be folded back in the forward direction and positioned over the rear insert 30 of the connector 20.

Figure 3:
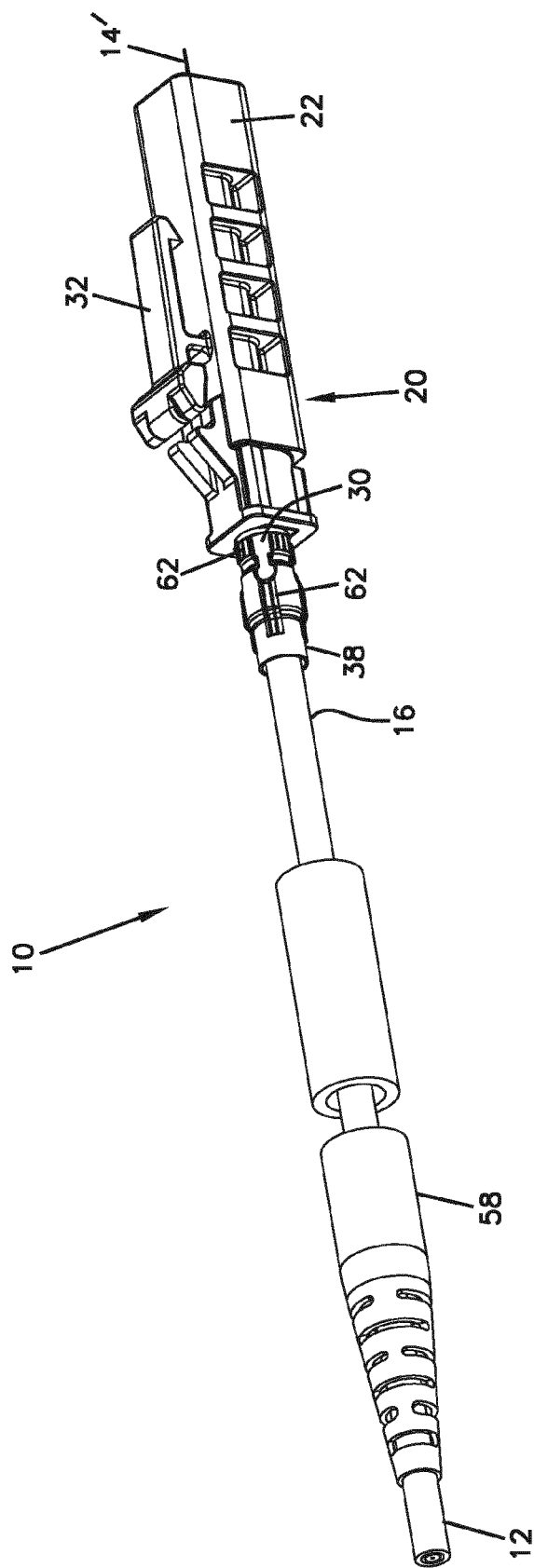
FIG. 3 illustrates the fiber optic connector assembly of FIGS. 1-2 in a partially assembled configuration with the strength member clamp coupled to the rear insert of the connector to capture a portion of the strength member layer therebetween and another portion of the strength member layer folded rearwardly over the strength member clamp.
Figure 4:
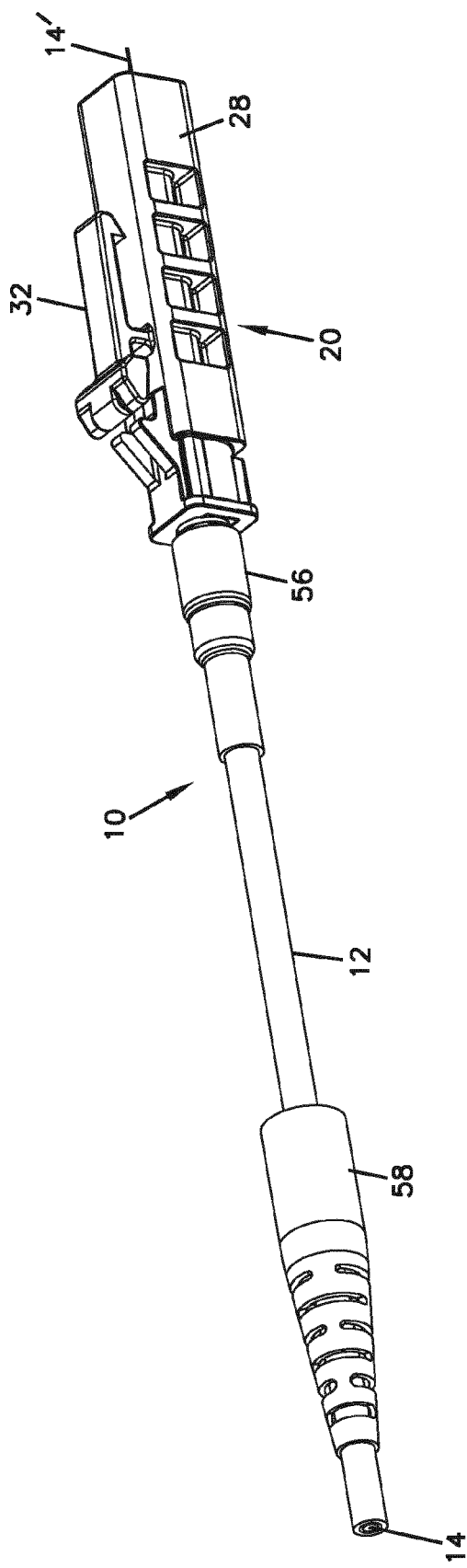
FIG. 4 illustrates the fiber optic connector assembly of FIGS. 1-3 in a partially assembled configuration with the heat-recoverable tube placed over the strength member clamp to fix the strength member clamp to the connector of the assembly.
Figure 9:
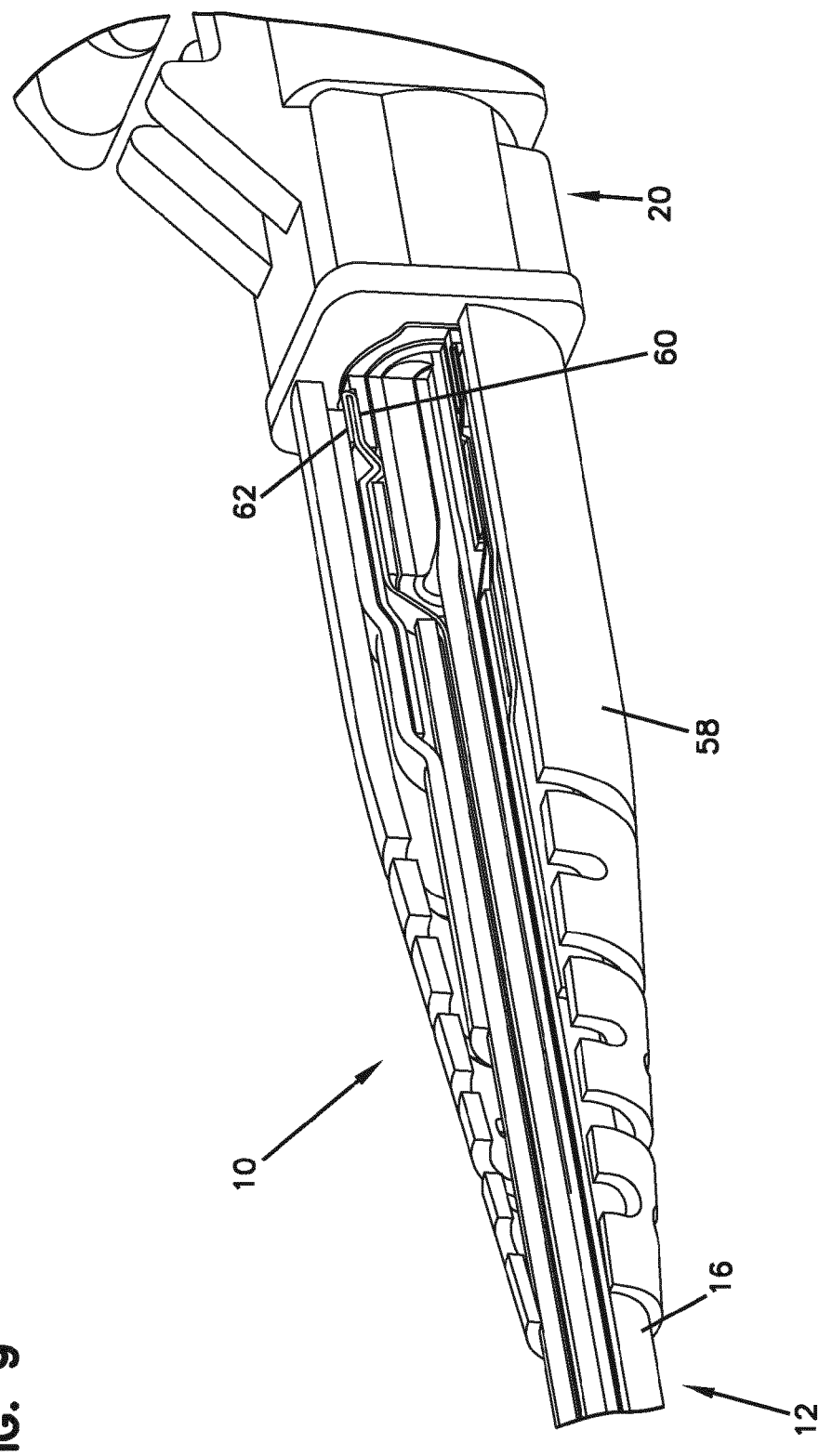
FIG. 9 illustrates the fiber optic connector assembly of FIGS. 1-5 in a fully assembled configuration with a portion of the assembly sectioned-out to illustrate the internal features thereof.
Figure 10:
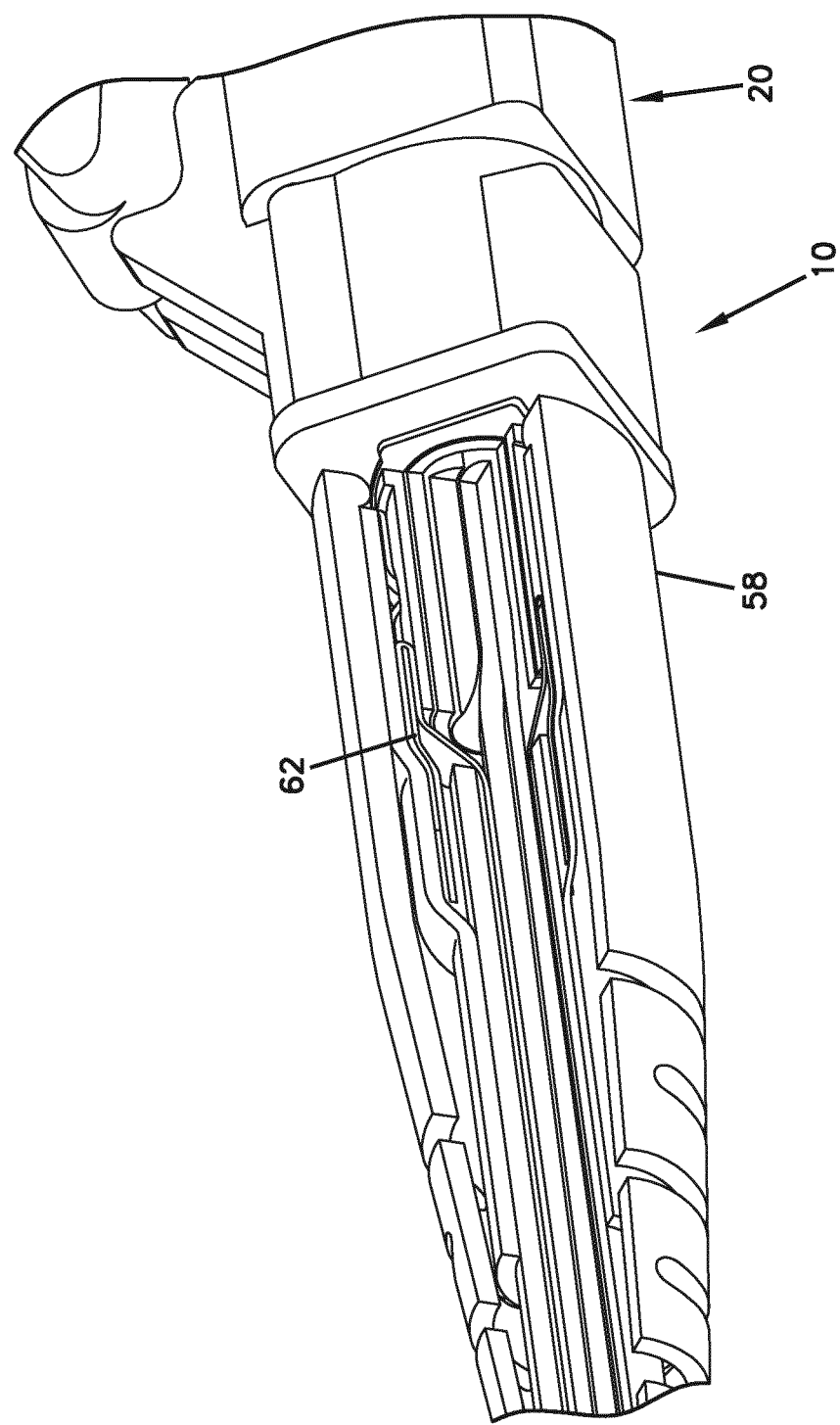
FIG. 10 illustrates the fiber optic connector assembly of FIGS. 1-5 in a fully assembled configuration with another portion of the assembly sectioned-away to illustrate the internal features thereof, the portion sectioned-away in FIG. 10 being 45° offset circumferentially with respect to the portion sectioned-away in FIG. 9.
Figure 13:
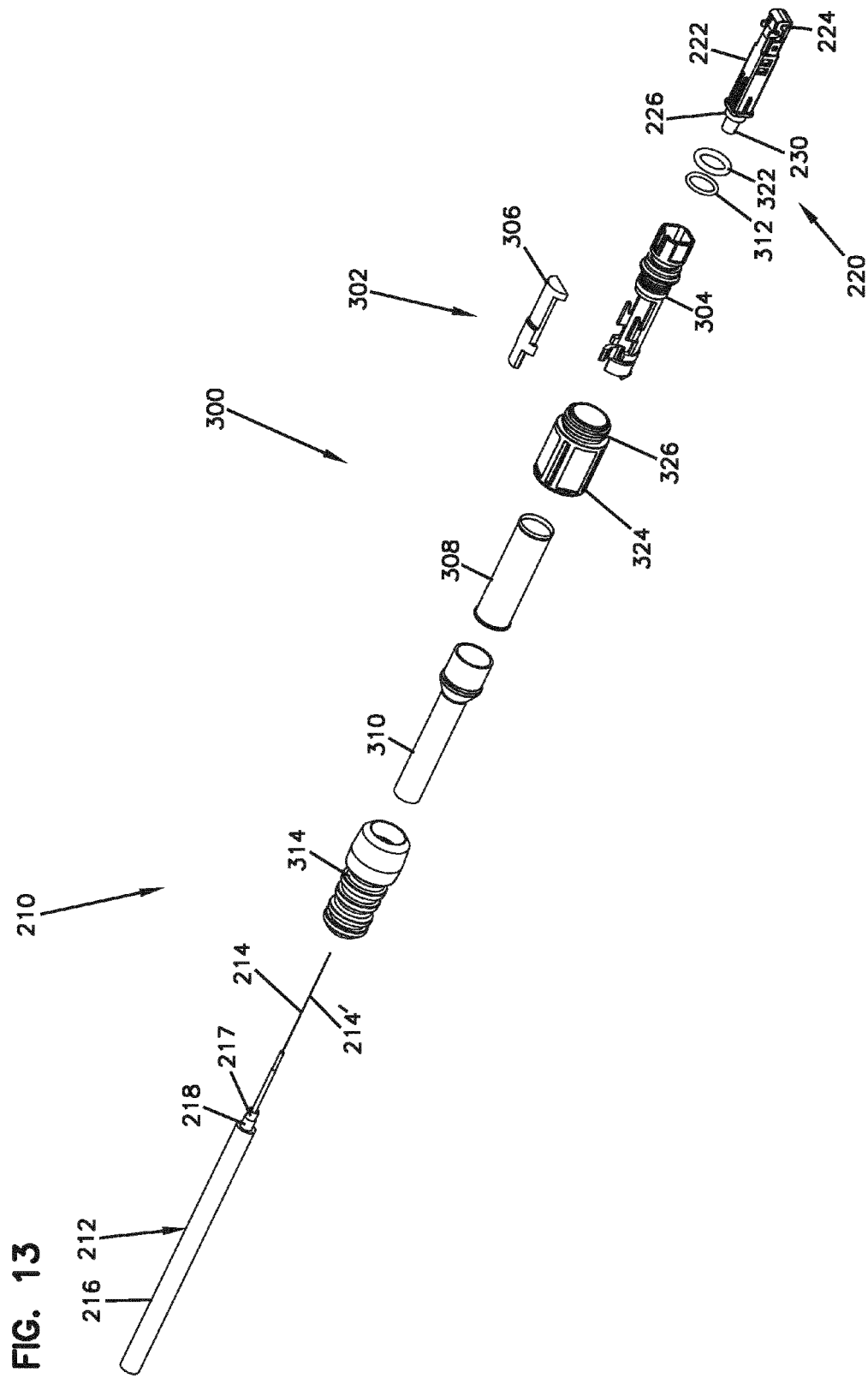
FIG. 13 is an exploded view of another fiber optic connector assembly in accordance with the principles of the present disclosure.
Figure 14:
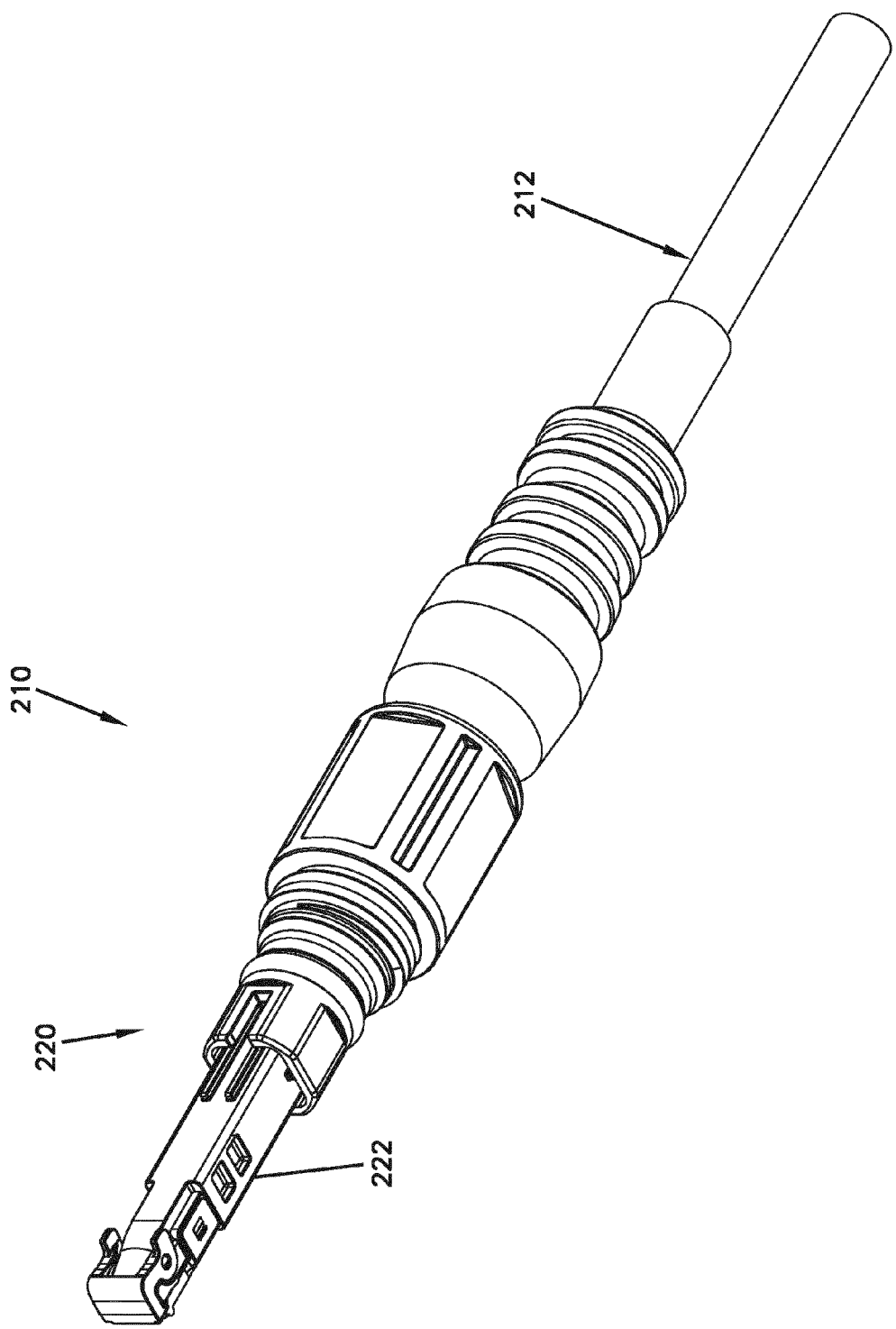
FIG. 14 is a perspective view of the fiber optic connector assembly of FIG. 13.
Figure 15:
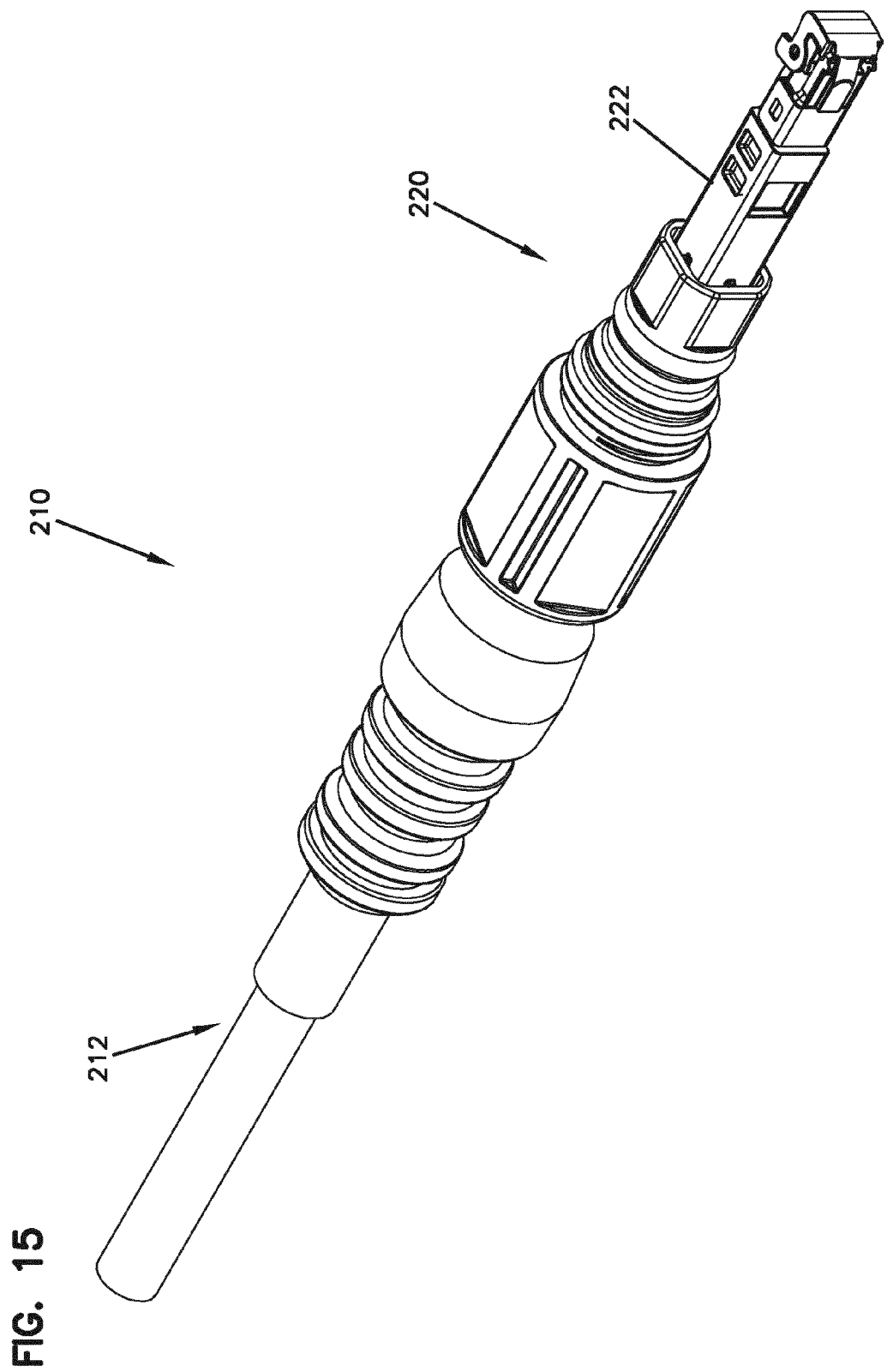
FIG. 15 is another perspective view of the fiber optic connector assembly of FIG. 13.

Thereafter, as shown in FIG. 3, the strength member clamp 38 of the assembly 10 is slid forward to be coupled to the rear insert 30 of the connector 20. The projections 54 of the flexible fingers 50 of the clamp 38 snap-fit into the notches 36 of the rear insert 30. When the strength member clamp 38 is coupled to the rear insert 30, a first portion 60 of the exposed length of the strength member layer 18 is captured between the projections 54 and the notches 36. As shown in FIG. 3, thereafter, a second portion 62 of the exposed length of the strength member layer 18 is folded rearwardly over an exterior of the clamp body 40. As shown, some of the aramid yarns defining the strength member layer 18 are folded directly over the fingers 50 (as shown in FIGS. 7 and 9) and some of the aramid yarns first slide through the slits 52 before being folded rearwardly over the clamp body 40 (as shown in FIGS. 8 and 10).

Once the clamp 38 is coupled to the rear insert 30 so as to capture the first portion 60 of the exposed length of the strength member layer 18 therebetween, the heat-recoverable tubing 56 may be positioned over the strength member clamp 38 so as to capture the second portion 62 of the exposed length of the strength member layer 18 that has been folded rearwardly over the clamp body 40. Once heat activated, the heat-recoverable tubing 56 fixes the strength member clamp 38 to the rear insert 30. As will be described further below, the heat-recoverable tubing 56 also includes an adhesive layer that is heat activated to fix the outer jacket 16 of the fiber optic cable 12 with respect to the rear insert 30 of the connector 20.

With the fiber optic connector termination arrangement of the present disclosure, wherein a portion 62 of the strength member layer 18 is folded rearwardly over the strength member clamp 38 and heat-shrunk thereagainst, any pulling forces on the strength member layer 18 are transmitted to the strength member clamp 38. Any sliding or slipping of the strength member layer 18 from underneath the structures used for crimping the strength layer 18 is thereby limited.

Figure 7:
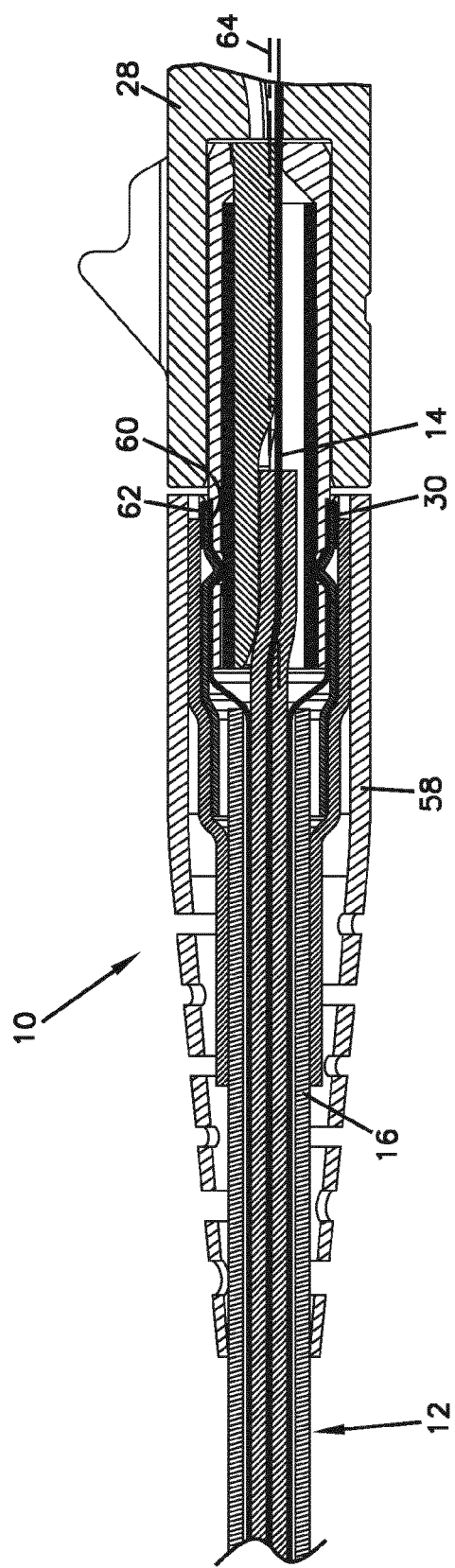
FIG. 7 is a cross-sectional view taken along line 7-7 of FIG. 6.
Figure 8:
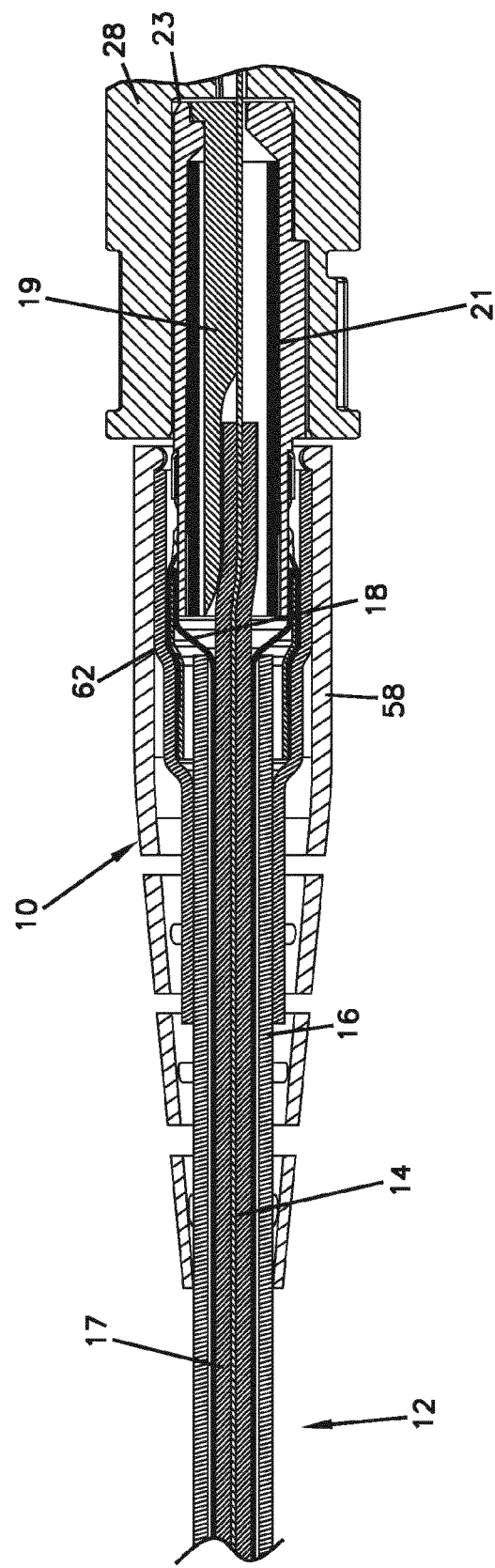
FIG. 8 is a cross-sectional view taken along line 8-8 of FIG. 6.

As shown in FIGS. 7 and 8, the strength member layer 18 is shown folded in a reverse direction around the front of the strength member clamp 38, and held in place with the heat-recoverable tubing 56. While the illustrated embodiment shows some of the strength member layer 18 folded over fingers 50, and some of the strength member layer 18 positioned in the slits 52, it is to be appreciated that all of layer 18 can be positioned over fingers 50, or all in slits 52. One advantage of positioning layer 18 over fingers 50 is that the first portion 60 is also captured between the projections 54 and the notches 36.

It should be noted that although the clamp body 40 of the strength member clamp 38 is depicted herein as forming a complete ring structure along its perimeter, a split-ring structure may also be used in accordance with the inventive aspects of the disclosure. Such a split-ring structure could be configured to compress to provide for a complete ring structure when exposed to radial forces from another structure clamping thereon such as the heat-recoverable tubing 56.

As noted above, the strain-relief boot 58 may be slid forwardly over the heat-recoverable tubing 56 once the fiber optic cable 12 has been terminated to the connector body 22 so as to provide bend radius protection to the optical fiber 14 of the cable 12.

It should be noted that the above described method of terminating the fiber optic cable 12 to the fiber optic connector 20 in accordance with the assembly 10 of the present disclosure is one example method. The sequence for the assembly 10 and the order of the steps of the method may be changed. For example, the strain-relief boot 58, the heat-recoverable tubing 56, and the strength member clamp 38 may be slid over the fiber optic cable 12 at a different point in the assembly than what is described above. For example, any of the strain-relief boot 58, the heat-recoverable tubing 56, and the strength member clamp 38 may be placed over the cable 12 after the cable 12 has been stripped.

According to the present disclosure, the fiber optic connector assembly 10 may be provided in kit form for terminating the fiber optic cable 12 to the fiber optic connector 20. For example, the kit may include a length of the fiber optic cable 12, the length of fiber optic cable 12 including the optical fiber 14, the outer jacket 16 surrounding the optical fiber 14, and the strength member layer 18 between the optical fiber 14 and the outer jacket 16. The kit may include the connector body 22 and the strength member clamp 38 configured to be coupled to the connector body 22 with the projections 54 snap-fitting into the notches 36. The kit may include the length of heat-recoverable tubing 56 for placement over the strength member clamp 38 for fixing the strength member clamp 38 to the connector body 22 and also the strain-relief boot 58 for slidable placement over the length of heat-recoverable tubing 56.

As shown in FIGS. 1-10 and as described above, the embodiments disclosed herein can utilize a dimensionally recoverable article such as the heat-recoverable tubing 56 for placement over the strength member clamp 38 and to assist in fixing the strength member clamp 38 relative to the connector body 22 and also in fixing the cable jacket 16 to the connector body 22. A dimensionally recoverable article is an article the dimensional configuration of which may be made substantially to change when subjected to treatment. Usually these articles recover towards an original shape from which they have previously been deformed, but the term "recoverable" as used herein, also includes an article which adopts a new configuration even if it has not been previously deformed.

A typical form of a dimensionally recoverable article is a heat-recoverable article, the dimensional configuration of which may be changed by subjecting the article to heat treatment. In their most common form, such articles comprise a heat-shrinkable sleeve made from a polymeric material exhibiting the property of elastic or plastic memory as described, for example, in U.S. Pat. No. 2,027,962 (Currie); U.S. Pat. No. 3,086,242 (Cook et al); and U.S. Pat. No. 3,597,372 (Cook), the disclosures of which are incorporated herein by reference. The polymeric material has been crosslinked during the production process so as to enhance the desired dimensional recovery. One method of producing a heat-recoverable article comprises shaping the polymeric material into the desired heat-stable form, subsequently crosslinking the polymeric material, heating the article to a temperature above the crystalline melting point (or, for amorphous materials the softening point of the polymer), deforming the article, and cooling the article while in the deformed state so that the deformed state of the article is retained. In use, because the deformed state of the article is heat-unstable, application of heat will cause the article to assume its original heat-stable shape.

In certain embodiments, the heat-recoverable article is a sleeve or a tube (such as the tube 56 of the assembly 10) that can include a longitudinal seam or can be seamless. In certain embodiments, the tube 56 has a dual wall construction including an outer, heat-recoverable annular layer, and an inner annular adhesive layer. In certain embodiments, the inner annular adhesive layer includes a hot-melt adhesive layer.

In one embodiment, the heat-recoverable tube 56 is initially expanded from a normal, dimensionally stable diameter to a dimensionally heat unstable diameter that is larger than the normal diameter. The heat-recoverable tube 56 is shape-set to the dimensionally heat unstable diameter. This typically occurs in a factory/manufacturing setting. The dimensionally heat unstable diameter is sized to allow the heat-recoverable tube 56 to be inserted over two components desired to be coupled together (e.g., the strength member clamp 38 and the rear insert 30 or the outer jacket 16 and the rear insert 30). After insertion over the two components, the tube 56 is heated thereby causing the tube 56 to shrink back toward the normal diameter such that the tube 56 radially compresses against the two components to secure the two components together. The adhesive layer is preferably heat activated during heating of the tube 56.

According to one embodiment, the heat-recoverable tube 56 may be formed from RPPM material that deforms to a dimensionally heat stable diameter generally at around 80° C. RPPM is a flexible, heat-shrinkable dual wall tubing with an integrally bonded meltable adhesive liner manufactured by Raychem.

According to another embodiment, the heat-recoverable tube 56 may be formed from HTAT material that deforms to a dimensionally heat stable diameter generally at around 110° C. HTAT is a semi-flexible, heat-shrinkable tubing with an integrally bonded meltable adhesive inner lining designed to provide moisture proof encapsulation for a range of substrates, at elevated temperatures. HTAT is manufactured by Raychem from radiation crosslinked polyolefins. The inner wall is designed to melt when heated and is forced into interstices by the shrinking of the outer wall, so that when cooled, the substrate is encapsulated by a protective, moisture proof barrier.

According to one embodiment, the heat-recoverable tube 56 may have a 4/1 shrink ratio between the dimensionally heat unstable diameter and the normal dimensionally heat stable diameter.

Figure 8A:
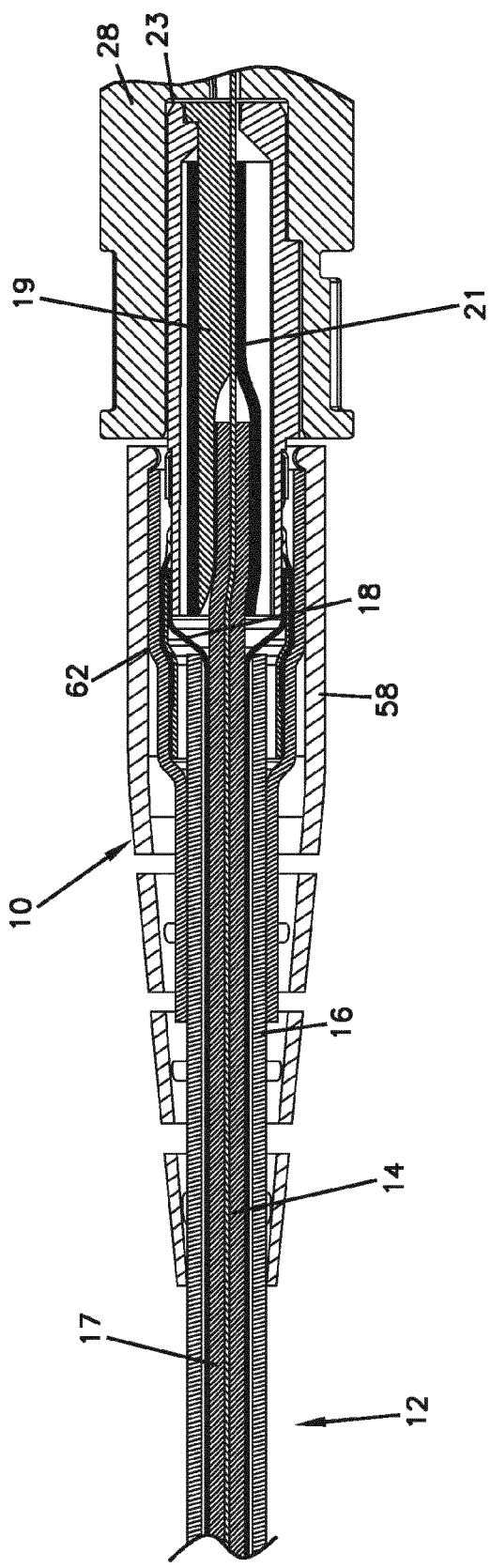
FIG. 8A is the cross-sectional view of FIG. 8 with an inner heat shrink tube oriented in a compressed configuration.

As shown at FIG. 8A, the cable 12 can include a buffer tube 17 that surrounds the optical fiber 14. The optical fiber 14 is secured to a fiber securement substrate 19 by a shape recoverable article 21 (e.g., a heat shrink sleeve having as described above an inner layer of adhesive such as hot melt adhesive). The shape recoverable article 21 surrounds the fiber securement substrate 19, a portion of the optical fiber 14 and an end portion of the buffer tube 17. The buffer tube 17 and the optical fiber 14 are compressed against and secured to the fiber securement substrate 19 by the shape recoverable article 21. FIG. 8 shows the shape recoverable article 21 in an expanded configuration and FIG. 8A shows the shape recoverable article 21 in a compressed configuration (i.e., a compact configuration, a constricted configuration, a reduced diameter configuration, etc.). The fiber securement substrate 19 is secured (e.g., anchored, attached, interlocked, constrained against axial movement relative to) within the metal insert 30 of at the rear of the connector. The metal insert 30 can be heated (e.g., by applying electrical current to the insert or by other means) to apply heat to the shape recoverable article 21 to cause the shape recoverable article to change from the expanded configuration to the compressed configuration. The optical fiber 14 extends forwardly from the fiber securement substrate 19 through the connector body 22. A ferrule-less end portion 14' (see FIG. 4) of the optical fiber 14 is accessible at the front mating end 24 of the connector body 22. The end portion of the buffer tube 17 can extend along a stepped-up portion of the fiber securement substrate 19. The term "ferrule-less end portion" means that the connector does not include a ferrule (e.g., a cylindrical sleeve or plug typically made of metal or ceramic) that mounts over and supports the optical fiber at the mating end of the connector.

Referring still to FIG. 8A, the fiber securement substrate 19 can be loaded into the rear insert 30 through a front end of the rear insert 30. A front retention structure 23 (e.g., a flange, lip, tab or other structure) of the fiber securement substrate 19 can abut, mate with, interlock with or otherwise engage a front end of the insert 30. The rear insert 30 can be press fit within the rear end of the connector body. As used herein, the front end of the connector is the mating end where the ferrule-less end portion 14' is accessible, and the rear end of the connector is the end where the cable is attached to the connector body.

FIGS. 11 and 12 show another fiber optic connector assembly 110 in accordance with the principles of the present disclosure. The fiber optic connector assembly 110 includes a fiber optic cable 112 terminated to a fiber optic connector 120. The fiber optic cable includes an optical fiber 114, a buffer tube 117 (e.g., a buffer tube having an outer diameter ranging from 300-1100 microns) that surrounds the optical fiber 114, an outer jacket 116 and a strength layer 118 positioned between the buffer tube 117 and the outer jacket 116. The optical fiber 114 can also include a coating layer 113 that covers a bare glass portion 111. The coating layer 113 can have an outer diameter in the range of 230-270 microns. The bare glass portion 111 can have a core having a diameter from 5-10 microns surrounded by a cladding layer having an outer diameter in the range of 120-130 microns. Other examples can have different dimensions. The strength layer 118 can provide tensile reinforcement to the cable 112 and can include strength members such as reinforcing aramid yarns. The fiber optic connector 120 includes a main connector body 122 having a front mating end 124 and a rear cable terminating end 126. An electrically conductive (e.g., metal) rear insert 130 is secured (e.g., press fit within) the rear cable terminating end 126 of the connector body 122. The optical fiber 114 extends from the fiber optic cable 112 forwardly through the main connector body 122 and has a ferrule-less end portion 114' that is accessible at the front mating end 124 of the connector body 122. The ferrule-less end portion 114' can be bare glass having an outer diameter in the range of 120-130 microns. Adjacent the rear cable terminating end 126 of the connector body 122, the optical fiber 114 is fixed/anchored against axial movement relative to the connector body. For example, as described above, the optical fiber 114 can be secured to a fiber securement substrate 119 by a shape recoverable article 121 (e.g., a heat shrink sleeve having an inner layer of hot melt adhesive). The fiber securement substrate 119 can be anchored within the rear insert 130. The rear insert 130 can be heated to move the shape recoverable article from an expanded configuration to a fiber retaining configuration (e.g., a compressed configuration). A fiber buckling region 190 (i.e., a fiber take-up region) is defined within the connector body 122 between the fiber anchoring location at the rear of the connector body 122 and the front mating end 124 of the connector body 122. When the connector 120 is mated within another connector, the end faces of the ferrule-less end portions 114' abut one another thereby causing the optical fibers 114 to be forced rearwardly into the connector bodies 122. As the optical fibers 114 are forced rearwardly into the connector bodies 122, the optical fibers 114 buckle/bend within the fiber buckling regions 190 (see FIG. 12). The fiber buckling regions 190 are designed so that minimum bend radius requirements of the optical fibers 114 are not violated. In one example, the fiber buckling regions are sized to accommodate at least 0.5 millimeters or at least 1.0 millimeters of rearward axial movement of the optical fibers 114. In one embodiment, the fiber buckling regions 190 have lengths from 15-25 millimeters. Fiber alignment structures 189 can be provided at the front mating ends 124 of the fiber optic connectors 120 for aligning the ferrule-less end portions 114' along insertion axes of the fiber optic connectors 120.

Referring still to FIGS. 11 and 12, a shape recoverable article 191 (e.g., a heat shrink sleeve having an inner layer of hot melt adhesive) is used to secure the outer jacket 116 of the fiber optic cable 112 to the rear insert 130. The shape recoverable article 191 overlaps and is bonded to the outer surface of the rear insert 130 and the outer surface of the outer jacket 116. An axial gap/spacing 192 is provided between a forward end 193 of the outer jacket 116 and a rearward end 194 of the rear insert 130. In one example, the axial gap 192 is 2-5 millimeters in length. The shape recoverable article 191 traverses the axial gap 192. The axial gap 192 can be filled or at least partially filled with an adhesive material 196 such as hot melt adhesive. A forward end portion 195 of the strength layer 118 extends forwardly beyond the forward end 193 of the outer jacket 116 and into the axial gap 192. The forward end portion 195 can be bonded to the rear insert 130 and or the shape recoverable article 191 by the adhesive 196 within the axial gap 192. In one example, the forward end portion 195 does not extend over the outer surface rear insert 130. In this way, the strength layer 118 does not interfere with heating of the rear insert 130 when the rear insert 130 is heated to shrink the shape recoverable article 121.

FIGS. 13-17 show another fiber optic connector assembly 210 in accordance with the principles of the present disclosure. The fiber optic connector assembly 210 includes a fiber optic cable 212 terminated to a fiber optic connector 220. The fiber optic cable includes an optical fiber 214, a buffer tube 217 that surrounds the optical fiber 214, an outer jacket 216 and strength layer 218 positioned between the buffer tube 217 and the outer jacket 216. The strength layer 218 can provide tensile reinforcement to the cable 212 and can include strength members such as reinforcing aramid yarns. The fiber optic connector 220 includes a front plug body 222 having a front mating end 224 and a rear end 226. An electrically conductive (e.g., metal) insert 230 is secured (e.g., press fit within) to the rear end 226 of the front plug body 222. The optical fiber 214 extends from the fiber optic cable 212 forwardly through the front plug body 222 and has a ferrule-less end portion 214' that is accessible at the front mating end 224 of the front plug body 222. The ferrule-less end portion 214' can be bare glass having an outer diameter in the range of 120-130 microns. Adjacent the rear end 226 of the front plug body 222, the optical fiber 214 is fixed/anchored against axial movement relative to the front plug body 222. For example, the optical fiber 214 can be secured to a fiber securement substrate 219 by a shape recoverable article 221 (e.g., a heat shrink sleeve having an inner layer of hot melt adhesive). The fiber securement substrate 219 can be anchored within the insert 230. The insert 230 can be heated to heat the shape recoverable article 221 thereby causing the shape recoverable article to move from an expanded configuration to a fiber retaining configuration (e.g., a compressed configuration). As shown at FIG. 17, the article 221 has not yet been moved from the expanded configuration to the compressed configuration. A fiber buckling region 290 (i.e., a fiber take-up region) is defined within the front plug body 222 between the fiber anchoring region and the front mating end 224 of the front plug body 222. The fiber buckling region 290 can have the same construction and functionality as the fiber buckling region 190 previously described herein.

The fiber optic connector 220 also includes a rear assembly 300. The rear assembly 300 has a ruggedized construction that is adapted for providing a hardened connection with a hardened fiber optic adapter. The rear assembly 300 is also configured for anchoring the strength layer 218 of the fiber optic cable 212 and for providing strain relief and bend radius protection to the fiber optic cable 212 at the interface between the fiber optic cable 212 and the fiber optic connector 220.

The rear assembly 300 includes a rear housing 302 including a main body 304 and a side cover 306. The rear end 226 of the front plug body 222 is secured within a front end of the rear housing 302 such that the fiber anchoring region is positioned within a front portion of the rear housing 302. A reinforcing metal sleeve 308 fits over the main body 304 and side cover 306 of the rear housing 302. The main body 304 and the side cover 306 can have a molded plastic construction. The metal sleeve 308 functions to provide side load reinforcement to the rear housing 302.

The rear assembly 300 further includes a heat shrink sleeve 310 having an inner adhesive layer. The heat shrink sleeve 310 is used to provide a mechanical connection and to provide sealing between the rear housing 302 and the outer jacket 216 of the fiber optic cable 212. As shown at FIG. 17, the heat shrink sleeve 310 traverses an interface between the outer jacket 216 and the rear housing 302 and is bonded to an outer surface of the outer jacket 216 and to an outer surface of the metal sleeve 308. Thus, the rear end of the metal sleeve 308 is environmentally sealed. The rear assembly 300 further includes a sealing member such as an O-ring 312 positioned between the inner surface of the metal sleeve 308 and the outer surface of the rear housing 302. The O-ring 312 provides an environmental seal adjacent the front end of the metal sleeve 308. In this way, moisture or other contaminants are prevented from entering the interior of the rear housing 302.

The rear assembly 300 further includes a boot 314 that mounts over the heat shrink sleeve 310 adjacent the rear end of the rear housing 302. The boot is configured to provide strain relief and bend radius protection to the fiber optic cable 212 at the interface between the fiber optic cable 212 and the fiber optic connector 220. Referring to FIG. 17, the outer jacket 216 of the fiber optic cable 212 extends inside the rear housing 302 and has a jacket end 316. The strength layer 218 of the fiber optic cable 212 also extends into the rear housing 302 and has an end portion 318 that extend forwardly beyond the jacket end 316 into the end interior chamber 320 of the rear housing 302. The interior chamber 320 can be defined by the main body 304 and the side cover 306 of the rear housing 302. In one example, the interior chamber 320 can be filled (e.g., potted) with an adhesive material (e.g., hot melt adhesive) such that the end portion 318 of the strength layer 218 is anchored within the interior chamber 320 of the rear housing 302. In certain examples, the adhesive material can also bond the metal sleeve to the rear housing 302. In still other examples, the end portion 318 of the strength layer 218 can be crimped to a barrel or other structure that is then mounted within the interior chamber 320. The barrel with the end portion 318 secured thereto can then be potted within the interior chamber 320. In certain examples, the interior chamber 320 can include a pocket sized to receive the barrel or other structure to which the end portion 318 of the strength layer 218 is secured. In certain examples, a barrier layer can be provided within the interior of the rear housing 302 for preventing the adhesive material used to secure the strength layer 218 to the rear housing 302 from reaching the fiber buckling region 290.

The rear assembly 300 further includes structure for sealing and securing the fiber optic connector 220 within a ruggedized fiber optic adapter. For example, the rear assembly 300 includes an outer sealing member 322 (e.g., an O-ring) mounted in a groove that extends around the periphery of the rear housing 302. The outer sealing member 322 is adapted to form a circumferential seal (e.g., a radial seal) with a sealing surface of a corresponding ruggedized adapter when the fiber optic connector 220 is inserted within the ruggedized adapter. The front end of the rear housing 302 can include one or more keys or other type of keying structure for insuring that the fiber optic connector 220 is inserted at a predetermined rotational orientation within the ruggedized fiber optic adapter. The rear assembly 300 further includes a retention nut 324 having exterior threads 326 that mate with corresponding interior threads defined within the port of a corresponding ruggedized fiber optic adapter. By threading the exterior threads 326 into the interior threads of the fiber optic adapter, the fiber optic connector 220 is retained within the port of the fiber optic adapter. The retention nut 324 can include a front end 328 that abuts against a corresponding shoulder 330 of the rear housing 302. The retention nut 324 is configured to rotate relative to the rear housing 302 to allow the retention nut 324 to be threaded into the port of the ruggedized fiber optic adapter.

Figure 18:
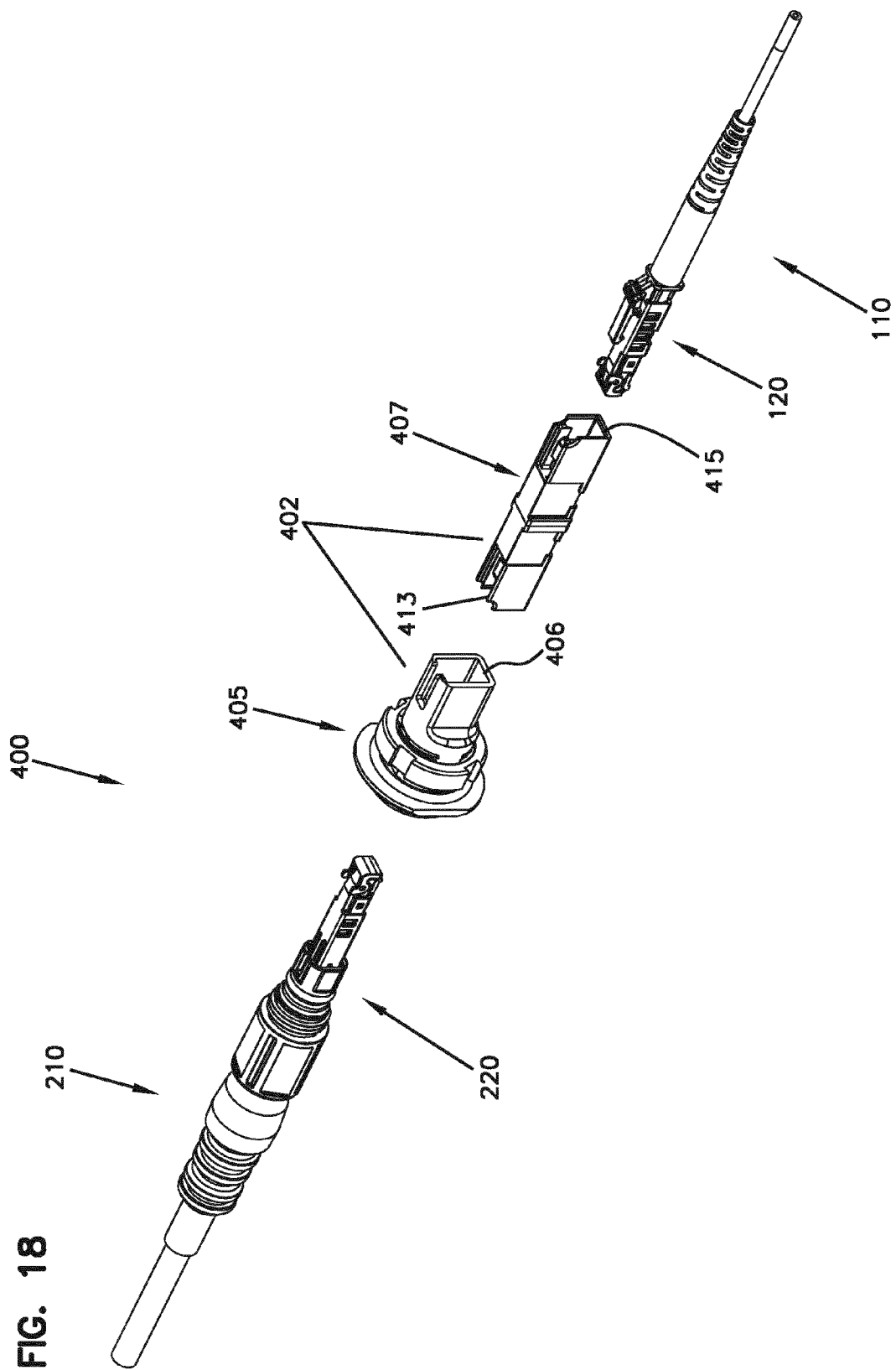
FIG. 18 is a perspective view of a fiber optic connection system including a fiber optic adapter for typically connecting the fiber optic connector assembly of FIG. 13 with the fiber optic connector assembly of FIG. 11.
Figure 19:
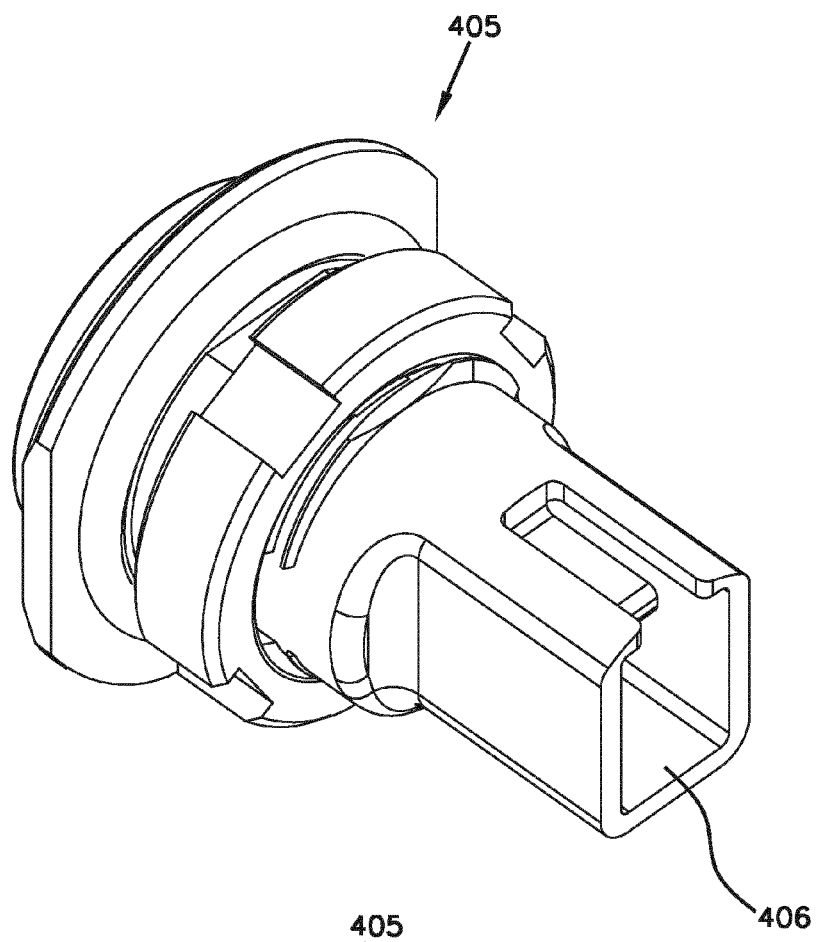
FIG. 19 is a perspective view showing a first end of the fiber optic adapter of the fiber optic connection system of FIG. 18.

FIG. 18 shows a fiber optic connection system 400 including a ruggedized fiber optic adapter assembly 402 for optically and mechanically connecting the fiber optic connector 220 to the fiber optic connector 120. The ruggedized fiber optic adapter assembly 402 is adapted to be mounted within a port of an enclosure or panel. A seal 403 (see FIG. 21) can be provided for providing an environmental seal between the ruggedized fiber optic adapter assembly 402 and the structure defining the port (e.g., the panel or enclosure wall). The ruggedized fiber optic adapter assembly 402 includes a ruggedized component 405 defining a first port 404 configured for receiving the fiber optic connector 220 and a second port 406 for receiving a fiber optic adapter component 407. The fiber optic adapter component 407 can include an internal fiber alignment structure (e.g., a V-groove or other type of fiber alignment groove) that receives the ferrule-less end portions of the fiber optic connectors 120, 220 and coaxially aligns the ferrule-less end portions such that an optical connection is made between the fiber optic connectors 120, 220.

Figure 20:
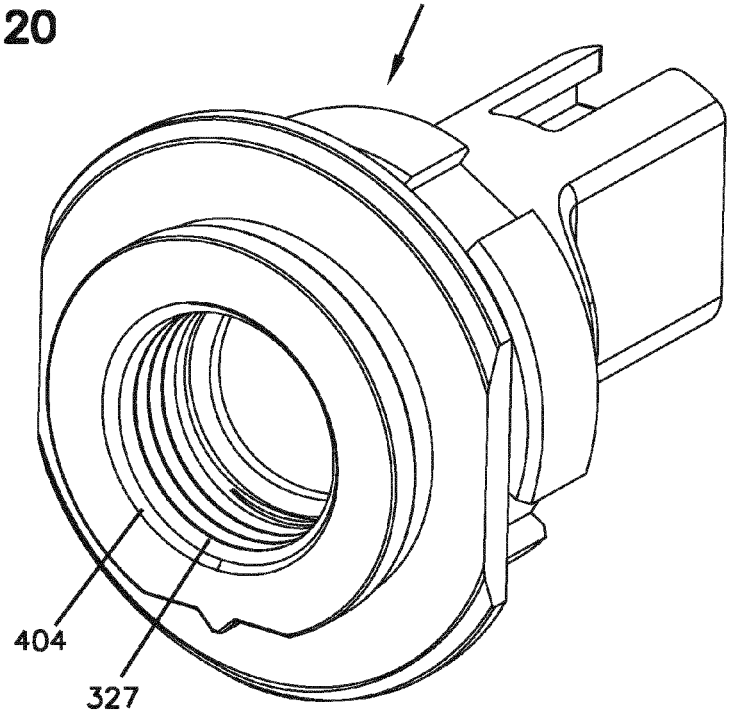
FIG. 20 is a perspective view of a second end of the fiber optic adapter of FIG. 19.
Figure 21:
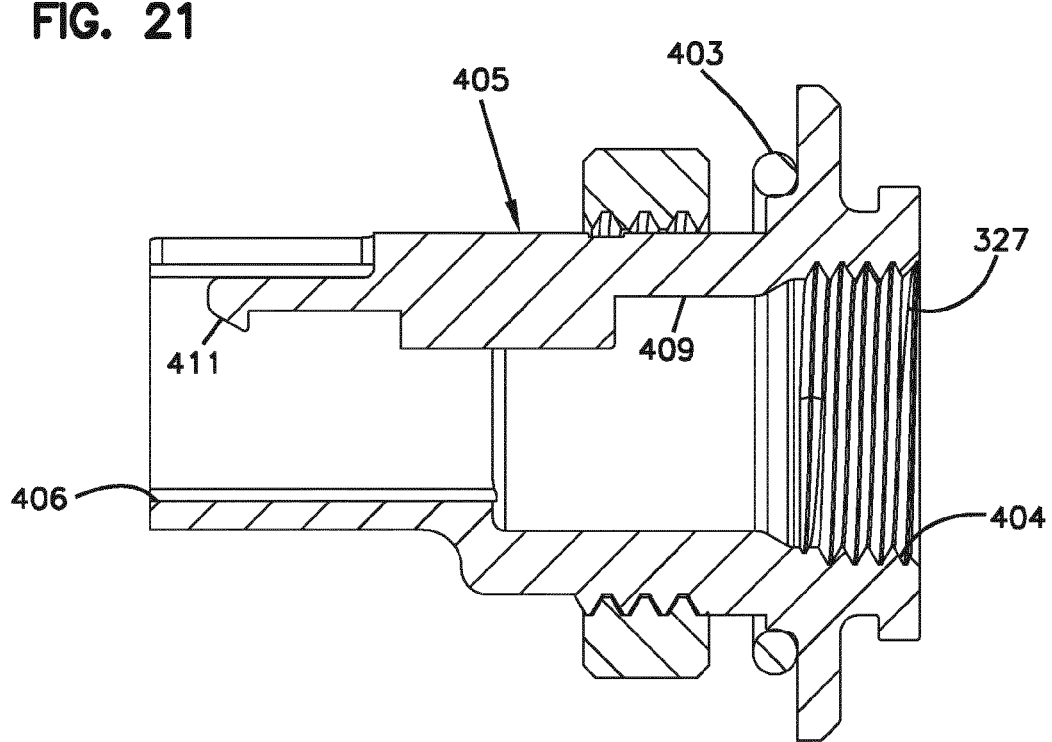
FIG. 21 is a cross-sectional view of the fiber optic adapter of FIGS. 19 and 20.

As shown at FIGS. 20 and 21, the first port 404 includes internal threads 327 that mate with the external threads 326 on the retention nut 324. In this way, by threading the retention nut 324 into the first port 404, the fiber optic connector 220 can be effectively secured within the first port 404. The outer sealing member 322 of the fiber optic connector 220 forms a radial seal with a sealing surface 409 (see FIG. 21) within the first port 404 to prevent moisture or other contaminants from entering the first port 404. The second port 406 is adapted for receiving the fiber optic adapter component 407 and can include a latch 411 (see FIG. 21) for latching the fiber optic adapter component 407 within the second port 406.

When the fiber optic connector 220 is secured within the first port 404, the front plug portion 222 of the fiber optic connector 220 fits within a first end 413 of the fiber optic adapter component 407. The fiber optic connector 120 latches within a second end 415 of the fiber optic adapter component 407. With both connectors 120, 220 positioned with the fiber optic adapter component 407, the ferrule-less end portions of the connectors 120, 220 are mechanically co-axially aligned in an end-to end relationship such that the optical fibers are optically coupled to one another.

It will be appreciated that the first port 404 can be positioned on the outside of an enclosure while the second port 406 can be positioned on the inside of an enclosure. In this way, the ruggedized nature of the first port 404 and the fiber optic connector 220 prevents moisture, dust or other contamination associated with an outside environment from entering the enclosure.

Although in the foregoing description, terms such as "top", "bottom", "front", "back", "right", "left", "upper", and "lower" may have been used for ease of description and illustration, no restriction is intended by such use of the terms. As discussed previously, the telecommunications equipment such as the fiber optic connector assemblies described herein can be used in any orientation, depending upon the desired application.

From the foregoing detailed description, it will be evident that modifications and variations can be made in the devices or methods of the disclosure without departing from the spirit or scope of the inventive aspects.

LIST OF REFERENCE NUMERALS AND
CORRESPONDING FEATURES

10—Fiber optic connector assembly
12—Fiber optic cable
14—Optical fiber
14'—Ferrule-less end portion
16—Outer jacket
17—Buffer tube
18—Strength member layer
19—Fiber securement substrate
20—Fiber optic connector
21—Shape recoverable article/sleeve
22—Connector body
23—Front retention structure
24—Front mating end of connector body
26—Rear cable termination end of connector body
28—Front housing of connector body
30—Rear insert of connector body
32—Adapter coupling structure of front housing
34—Portion of rear insert protruding from front housing
36—Notches
38—Strength member clamp
40—Clamp body
42—Front end of clamp body
44—Rear end of clamp body
46—Throughhole of clamp body
48—Circular ring portion of clamp body
50—Fingers of clamp body
52—Slits between fingers
54—Projections on fingers
56—Heat-recoverable tubing
58—Strain-relief boot
60—First portion of strength member layer captured between clamp and rear insert
62—Second portion of strength member layer folded rearwardly over clamp
64—Longitudinal axis of strength member clamp body
110—Fiber optic connector assembly
111—Bare glass portion
112—Fiber optic cable
113—Coating layer
114—Optical fiber
114'—Ferrule-less end portion
116—Outer jacket
117—Buffer tube
118—Strength member layer
119—Fiber securement substrate
120—Fiber optic connector
121—Shape recoverable article/sleeve
122—Connector body
124—Front mating end of connector body
126—Rear cable termination end of connector body
130—Rear insert of connector body
189—Fiber alignment structures
190—Fiber buckling region
191—Shape recoverable article/sleeve
192—Axial gap/spacing
193—Forward end
194—Rearward end
195—Forward end portion
196—Adhesive material
210—Fiber optic connector assembly
212—Fiber optic cable
214—Optical fiber
214'—Ferrule-less end portion
216—Outer jacket
217—Buffer tube
218—Strength layer
219—Fiber securement substrate
220—Fiber optic connector
221—Shape recoverable article/sleeve
222—Front plug body
224—Front mating end
226—Rear end
230—Electrically conductive insert
290—Fiber buckling region
300—Rear assembly
302—Rear housing
304—Main body
306—Side cover
308—Metal sleeve
310—Heat shrink sleeve
312—O-ring
314—Boot
316—Forward jacket end
318—Forward end portion
320—Interior chamber
322—Outer sealing member
324—Retention nut
326—Exterior threads
327—Internal threads
328—Front end
330—Shoulder
400—Fiber optic connection system
402—Ruggedized fiber optic adapter assembly
403—Seal
404—First port
405—Ruggedized component
406—Second port
407—Fiber optic adapter component
409—Sealing surface
411—Latch
413—First end
415—Second end

What is claimed is:

1. A fiber optic connector assembly comprising:
a fiber optic connector including a main connector body having a front mating end and a rear cable termination end, the fiber optic connector also including a rear insert secured within the rear cable termination end of the main connector body;
a fiber optic cable including an optical fiber, a strength layer and an outer jacket, the optical fiber extending from the fiber optic cable forwardly through the main connector body and having a ferrule-less end portion accessible at the front mating end of the main connector body, the optical fiber being secured to a fiber securement substrate by a first shape recoverable sleeve, the fiber securement substrate being anchored within the rear insert;
the outer jacket of the fiber optic cable having a forward end and the rear insert having a rearward end, the forward end of the outer jacket being positioned such that an axial gap exists between the forward end of the outer jacket and the rearward end of the rear insert;
a second shape recoverable sleeve that secures the outer jacket to the rear insert, the second shape recoverable sleeve overlapping and being bonded to outer surfaces of the outer jacket and the rear insert, the second shape recoverable sleeve traversing the axial gap; and
adhesive material at least partially filling the axial gap.

2. The fiber optic connector assembly of claim 1, wherein the adhesive material is hot melt adhesive.

3. The fiber optic connector assembly of claim 1, wherein the strength layer includes a forward portion that extends forwardly with respect to the forward end of the outer jacket and is bonded to the adhesive that at least partially fills the axial gap.

4. The fiber optic connector assembly of claim 1, wherein the first shape recoverable sleeve is moved from an expanded configuration to a compressed configuration by heating the rear insert.

5. The fiber optic connector assembly of claim 4, wherein the rear insert is electrically conductive.

6. The fiber optic connector assembly of claim 5, wherein the rear insert is metal.

7. The fiber optic connector assembly of claim 1, wherein the main connector body defines a fiber buckling region between the front mating end of the main connector body and the rear insert.

8. The fiber optic connector assembly of claim 7, wherein the fiber buckling region is configured to take-up at least 0.5 millimeters of excess fiber length without violating minimum bend radius requirements of the optical fiber and without causing unacceptable levels of attenuation.

9. The fiber optic connector assembly of claim 1, wherein the axial gap is 2-5 millimeters in length.

10. The fiber optic connector assembly of claim 3, wherein the forward portion does not extend over the outer surface of the rear insert.

11. A fiber optic connector assembly comprising:
a fiber optic connector including a front plug body having a front mating end and a rear end, the fiber optic connector also including an insert secured within the rear end of the front plug body;
a fiber optic cable including an optical fiber (214), a strength layer and an outer jacket, the optical fiber extending from the fiber optic cable forwardly through the front plug body and having a ferrule-less end portion accessible at the front mating end of the front plug body, the optical fiber being secured to a fiber securement substrate by a first shape recoverable sleeve, the fiber securement substrate being anchored within the insert;
a rear housing having a front end to which the rear end of the front plug body is secured, the insert being positioned at least partially within the front end of the rear housing, the rear housing having an interior chamber;
the outer jacket of the fiber optic cable having a forward jacket end positioned within the interior chamber, and strength layer having a forward end portion that projects forwardly beyond the forward jacket end, the forward end portion being anchored within the interior chamber of the rear housing.

12. The fiber optic connector assembly of claim 11, wherein the forward end portion is adhesively potted within the interior chamber.

13. The fiber optic connector assembly of claim 12, wherein the forward end portion is adhesively potted within the interior chamber by hot melt adhesive.

14. The fiber optic connector assembly of claim 11, further comprising a retention nut rotatably mounted about the rear housing for securing the fiber optic connector within a fiber optic adapter.

15. The fiber optic connector assembly of claim 14, further comprising a sealing member mounted about a periphery of the rear housing for forming a radial seal with the fiber optic adapter.

16. The fiber optic connector assembly of claim 11, further comprising a metal sleeve mounted over the rear housing, and a second heat shrink sleeve adhered to the metal sleeve and the outer jacket of the fiber optic cable.

* * * * *